(12) United States Patent
Ullman

(10) Patent No.: US 7,305,461 B2
(45) Date of Patent: Dec. 4, 2007

(54) METHOD AND SYSTEM FOR NETWORK MANAGEMENT WITH BACKUP STATUS GATHERING

(75) Inventor: Lorin Evan Ullman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 09/737,434

(22) Filed: Dec. 15, 2000

(65) Prior Publication Data

US 2002/0112039 A1    Aug. 15, 2002

(51) Int. Cl.
*G06F 15/173* (2006.01)
(52) U.S. Cl. ............... 709/223; 709/221; 709/224; 370/354
(58) Field of Classification Search ......... 709/227, 709/221–226, 246; 705/8; 701/1; 379/219; 700/105; 370/354
See application file for complete search history.

(56) References Cited

U.S. PATENT DOCUMENTS

| | | | | |
|---|---|---|---|---|
| 5,191,534 A * | 3/1993 | Orr et al. | ............... | 700/105 |
| 5,790,525 A | 8/1998 | Ono et al. | ............... | 370/244 |
| 5,812,826 A | 9/1998 | McLain, Jr. | ............... | 395/500 |
| 5,826,239 A * | 10/1998 | Du et al. | ............... | 705/8 |
| 5,862,338 A | 1/1999 | Walker et al. | ............... | 395/200.54 |
| 6,012,084 A | 1/2000 | Fielding et al. | ............... | 709/205 |
| 6,021,437 A * | 2/2000 | Chen et al. | ............... | 709/224 |
| 6,049,825 A * | 4/2000 | Yamamoto | ............... | 709/221 |
| 6,113,495 A * | 9/2000 | Walker et al. | ............... | 463/42 |
| 6,151,627 A * | 11/2000 | McBride et al. | ............... | 709/224 |
| 6,175,866 B1 * | 1/2001 | Holloway et al. | ............... | 709/223 |

(Continued)

OTHER PUBLICATIONS

Hierarchical performance management using OAM MIB in ATM networks; Yong-Hoon Choi; Kil-Hung Lee; Sung-Yee Chang; Choon Park; Jai-Yong Lee; Sang-Bae Lee; Global Telecommunications Conference, 1997. GLOBECOM '97., IEEE, vol. 1, Nov. 3-8, 1997.*

(Continued)

*Primary Examiner*—Thong Vu
(74) *Attorney, Agent, or Firm*—Duke W. Yee; Jeffrey S. Labaw; Wayne P. Bailey

(57) ABSTRACT

A method, system, apparatus, and computer program product are presented for management of a distributed data processing system. Resources within the distributed data processing system are dynamically discovered, and the discovered resources are adaptively monitored using the network management framework. A network or system administrator configures some mission critical endpoints with multiple network interface cards (NICs) and specifies mission critical endpoints, non-mission critical actions, etc. During status collection activities associated with network or system management activities, the categorization of an endpoint as a mission-critical or non-mission critical endpoint affects the manner in which the status collection activity is performed. Applications can request the performance of actions at endpoints without regard to the categorization of the endpoint or without regard to the categorization of the requested action, and the network management system routes the action based on whether or not the specified endpoint is a mission critical endpoint. A non-mission-critical endpoint is associated with a mission-critical endpoint based on the non-mission-critical endpoint's communication history with the mission critical endpoint. The management system may use the status of a non-mission-critical endpoint as a reflection of the status of a mission-critical endpoint.

12 Claims, 22 Drawing Sheets

U.S. PATENT DOCUMENTS

| | | | |
|---|---|---|---|
| 6,308,205 B1* | 10/2001 | Carcerano et al. | 709/221 |
| 6,405,250 B1* | 6/2002 | Lin et al. | 709/224 |
| 6,421,733 B1* | 7/2002 | Tso et al. | 709/246 |
| 6,457,053 B1* | 9/2002 | Satagopan et al. | 709/226 |
| 6,470,386 B1* | 10/2002 | Combar et al. | 709/224 |
| 6,502,132 B1* | 12/2002 | Kumano et al. | 709/224 |
| 6,505,248 B1* | 1/2003 | Casper et al. | 709/224 |
| 6,526,442 B1* | 2/2003 | Stupek et al. | 709/224 |
| 6,597,689 B1* | 7/2003 | Chiu et al. | 370/354 |
| 6,668,282 B1* | 12/2003 | Booth et al. | 709/224 |
| 6,694,001 B1* | 2/2004 | Lampell et al. | 379/189 |
| 6,983,317 B1* | 1/2006 | Bishop et al. | 709/223 |
| 2002/0194251 A1* | 12/2002 | Richter et al. | 709/105 |

OTHER PUBLICATIONS

Inter-Domain Management between CORBA and SNMP: WEB-based..—Mazumdar (1996) "Inter-Domain Management between CORBA and SNMP"Seventh IFIP/IEEE International Workshop on www.bell-labs.com/user/mazum/papers/XoJIDM/CORBASnmpExt.*

Integration of SNMP into a CORBA- and Web-based..—Aschemann, Mohr, Ruppert (1999) Integration of SNMP into a CORBA and Webbased Management www.isa.informatik.tu-darmstadt.de/VS/Publikationen/papers/kivs99-cosnmpgw.ps.g.*

Policy-Based Enhancements to the SNMP Framework—Saperia, Schönwälder (2000) ; www.ibr.cs.tu-bs.de/vs/papers/polictr-00-02.ps.gz.*

* cited by examiner

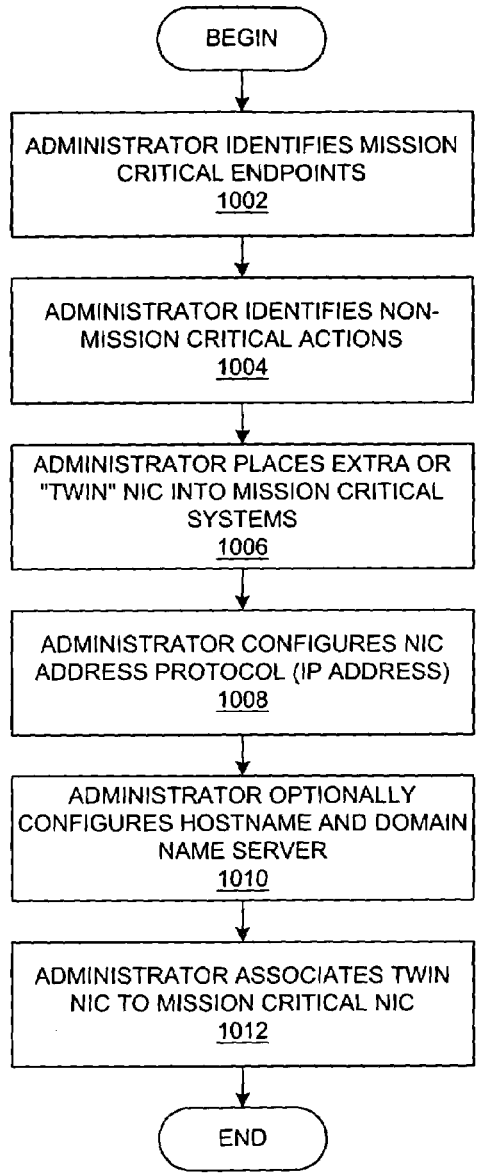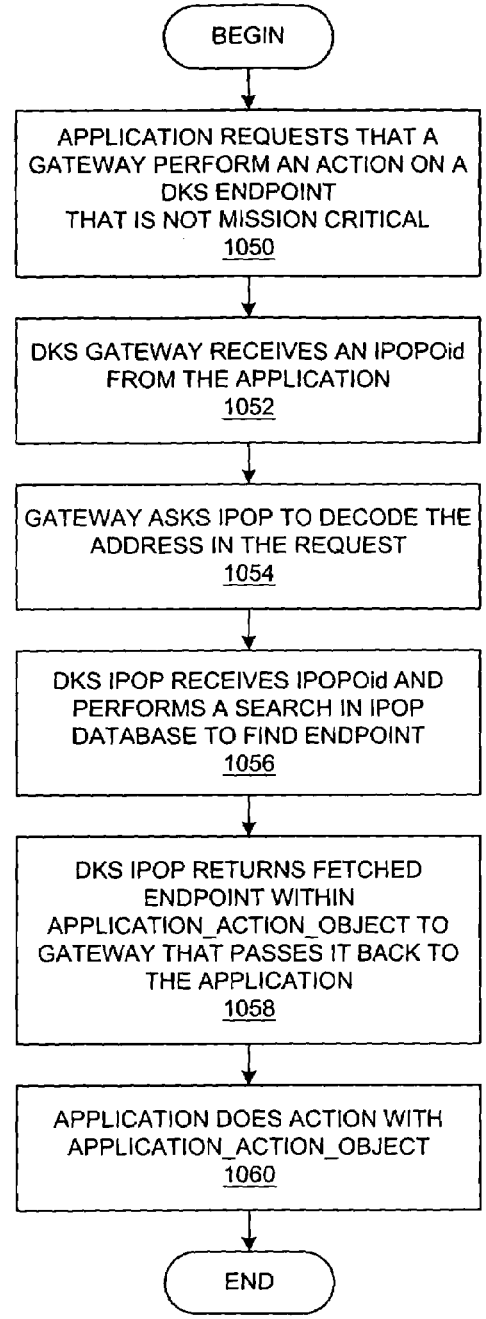
FIG. 10A
FIG. 10D

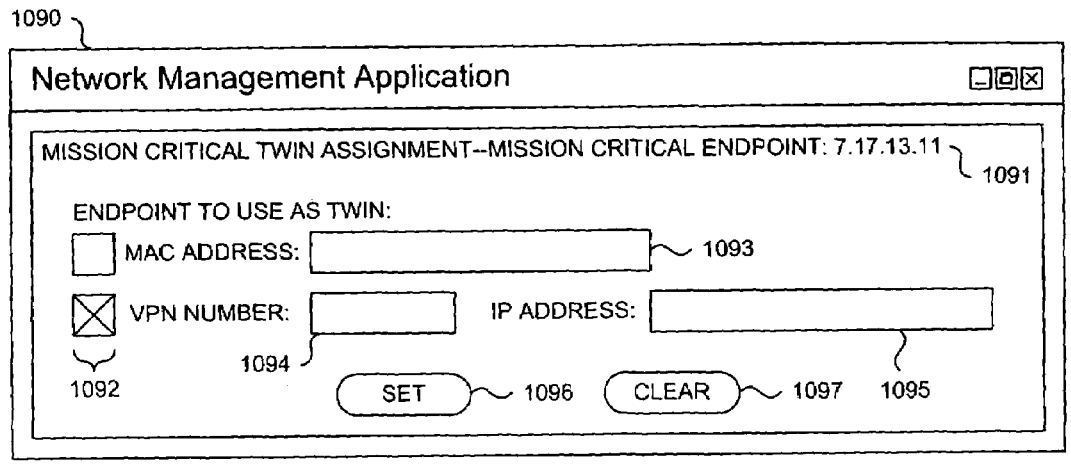

*FIG. 10F*

```
CLASS ACTION_OBJECT {

// CONSTRUCTOR
    ACTION_OBJECT( LONG IPADDRESS, SHORT VIRTUALPRIVATENETWORKADDRESS )
        THROWS BADADDRESS ...
    .
    .
    .
    VOID PERFORMACTION( ) // EXECUTES ACTION METHOD
    .
    .
    .
}
```

*FIG. 11A*

```
CLASS APPLICATION_ACTION_OBJECT EXTENDS ACTION_OBJECT { boolean IsMissionCriticalAction;
        // TRUE = USED TO PERFORM ENTERPRISE-RELATED WORK
        // FALSE = USED TO PERFORM MONITORING OPERATIONS
        //        OR OTHER NON-REVENUE PRODUCING ACTION boolean TwinUsedinReroute;
        // TRUE = IPOP HAS REPLACED REQUESTED ADDRESS WITH AN ADDRESS
        //        THAT CAN BE USED FOR NON-MISSION CRITICAL ACTION
    .
    .
    .
}
```

*FIG. 11B*

```
Public Class Endpoint {

//public variables
    long      EPObjectID;   // ID to object (both private and public network addresses)
    InetAddress  EPIPAddress; // physical network address (private or public)
    long      EPVPN;        // virtual private network ID // get/set of variables
    public long          getObjectID( ) { ... }
    public InetAddress   getPAddress( ) { ... }
    public long          getVPN( ) { ... }

```
Class TwinMissionCriticalEndpoint extends Endpoint {
    .
    .
    .
    IPOPOid    missionCriticalEndpoint;
                    // Mission critical endpoint that is used to gather status
    IPOPOid    missionCriticalSystem;
                    // Mission critical system long       endpointStatus;
    long       twinEndpointStatus;
    .
    .
    .
}
```

*FIG. 11D*

```
Class MissionCriticalEndpoint extends Endpoint {
    .
    .
    .
    boolean    useForMonitoring;  // TRUE = endpoint can be used for monitoring,
                                  // polling, and other system-management-type
                                  // resources
    .
    .
    .
}
```

*FIG. 11E*

… # METHOD AND SYSTEM FOR NETWORK MANAGEMENT WITH BACKUP STATUS GATHERING

CROSS-REFERENCE TO RELATED APPLICATIONS

The present application is related to the following applications: application Ser. No. 09/738,337, filed Dec. 15, 2000, titled "Method and System for Network Management With Adaptive Monitoring and Discovery of Computer Systems Based on User Login"; application Ser. No. 09/737,727, filed Dec. 15, 2000, titled "Method and System for Network Management With Per-Endpoint Adaptive Data Communication Based on Application Life Cycle"; application Ser. No. 09/737,726, filed Dec. 15, 2000, titled "Method and System for Network Management With Per-Endpoint Monitoring Based on Application Life Cycle"; application Ser. No. 09/737,431, filed Dec. 15, 2000, titled "Method and System for Network Management With Redundant Monitoring and Categorization of Endpoints".

BACKGROUND OF THE INVENTION

1. Field of the Invention

The present invention relates to an improved data processing system and, in particular, to a method and system for multiple computer or network management. Still more particularly, the present invention provides a method and system for computer network monitoring.

2. Description of Related Art

Technology expenditures have become a significant portion of operating costs for most enterprises, and businesses are constantly seeking ways to reduce information technology (IT) costs. This has given rise to an increasing number of outsourcing service providers, each promising, often contractually, to deliver reliable service while offloading the costly burdens of staffing, procuring, and maintaining an IT organization. While most service providers started as network pipe providers, they are moving into server outsourcing, application hosting, and desktop management. For those enterprises that do not outsource, they are demanding more accountability from their IT organizations as well as demanding that IT is integrated into their business goals. In both cases, "service level agreements" have been employed to contractually guarantee service delivery between an IT organization and its customers. As a result, IT teams now require management solutions that focus on and support "business processes" and "service delivery" rather than just disk space monitoring and network pings.

IT solutions now require end-to-end management that includes network connectivity, server maintenance, and application management in order to succeed. The focus of IT organizations has turned to ensuring overall service delivery and not just the "towers" of network, server, desktop, and application. Management systems must fulfill two broad goals: a flexible approach that allows rapid deployment and configuration of new services for the customer; and an ability to support rapid delivery of the management tools themselves. A successful management solution fits into a heterogeneous environment, provides openness with which it can knit together management tools and other types of applications, and a consistent approach to managing all of the IT assets.

With all of these requirements, a successful management approach will also require attention to the needs of the staff within the IT organization to accomplish these goals: the ability of an IT team to deploy an appropriate set of management tasks to match the delegated responsibilities of the IT staff; the ability of an IT team to navigate the relationships and effects of all of their technology assets, including networks, middleware, and applications; the ability of an IT team to define their roles and responsibilities consistently and securely across the various management tasks; the ability of an IT team to define groups of customers and their services consistently across the various management tasks; and the ability of an IT team to address, partition, and reach consistently the managed devices.

Many service providers have stated the need to be able to scale their capabilities to manage millions of devices. When one considers the number of customers in a home consumer network as well as pervasive devices, such as smart mobile phones, these numbers are quickly realized. Significant bottlenecks appear when typical IT solutions attempt to support more than several thousand devices.

Given such network spaces, a management system must be very resistant to failure so that service attributes, such as response time, uptime, and throughput, are delivered in accordance with guarantees in a service level agreement. In addition, a service provider may attempt to support as many customers as possible within a single network management system. The service provider's profit margins may materialize from the ability to bill the usage of a common network management system to multiple customers.

On the other hand, the service provider must be able to support contractual agreements on an individual basis. Service attributes, such as response time, uptime, and throughput, must be determinable for each customer. In order to do so, a network management system must provide a suite of network management tools that is able to perform device monitoring and discovery for each customer's network while integrating these abilities across a shared network backbone to gather the network management information into the service provider's distributed data processing system.

Hence, there is a direct relationship between the ability of a management system to provide network monitoring and discovery functionality and the ability of a service provider using the management system to serve multiple customers using a single management system. Preferably, the management system can replicate services, detect faults within a service, restart services, and reassign work to a replicated service. By implementing a common set of interfaces across all of their services, each service developer gains the benefits of system robustness. A well-designed, component-oriented, highly distributed system can easily accept a variety of services on a common infrastructure with built-in fault-tolerance and levels of service.

Distributed data processing systems with thousands of nodes are known in the prior art. The nodes can be geographically dispersed, and the overall computing environment can be managed in a distributed manner. The managed environment can be logically separated into a series of loosely connected managed regions, each with its management server for managing local resources. The management servers coordinate activities across the enterprise and permit remote site management and operation. Local resources within one region can be exported for the use of other regions in a variety of manners.

Meeting quality-of-service objectives in a highly distributed system can be quite difficult. Various resources throughout the distributed system can fail, and the failure of one resource might impact the availability of another resource. A signification amount of management activity may be introduced into the system in order to provide fault tolerance.

However, within a system that performs network management tasks for a million devices or more, a tremendous amount of computational resources throughout the system could be consumed for the managerial functions. For example, function calls could be constantly blocking to wait for a security function to complete, and significant network bandwidth would be consumed by status messages throughout the system.

When management activities are performed at a particular machine, a measurable amount of bandwidth will be consumed. In general, a customer does not want to experience a reduction in system performance, such as slower communication speeds, when a system is busy performing system management activities, whether or not those management activities might be considered critical to overall system or network performance. A service provider should attempt to minimize the reduction of bandwidth that is caused by any system management activities while also attempting to increase the reliability of the system through fault-tolerant solutions.

The goal of avoiding a reduction in system performance is particularly true for mission critical systems within the distributed data processing system. For example, a mission critical machine should not be used to monitor a less critical machine because the performance of the mission critical machine is reduced for a non-mission-critical action, which presumably reverses the desired priorities of the service provider. Using similar reasoning, if possible, a service provider would rather not burden a mission critical machine with a monitoring operation that is directed to determining the mission critical machine's own status.

Typically, a network management system allows an administrator to statically define a non-mission critical machine that may be used to monitor a mission critical machine so that the performance of the mission critical machine is not reduced. However, the static assignment process can be inflexible, and the administrator then has a burden to choose the associations between non-mission-critical machines and mission critical machines.

Therefore, it would be particularly advantageous to provide a method and system that provides a flexible polling and monitoring scheme associated with network management tasks in a highly distributed system. It would be particularly advantageous for the network management system to provide automatic associations between mission critical and non-mission critical endpoints.

SUMMARY OF THE INVENTION

A method, system, apparatus, and computer program product are presented for management of a distributed data processing system. Resources within the distributed data processing system are dynamically discovered, and the discovered resources are adaptively monitored using the network management framework. A network or system administrator configures some mission critical endpoints with multiple network interface cards (NICs) and specifies mission critical endpoints, non-mission critical actions, etc. During status collection activities associated with network or system management activities, the categorization of an endpoint as a mission-critical or non-mission critical endpoint affects the manner in which the status collection activity is performed. Applications can request the performance of actions at endpoints without regard to the categorization of the endpoint or without regard to the categorization of the requested action, and the network management system routes the action based on whether or not the specified endpoint is a mission critical endpoint. A non-mission-critical endpoint is associated with a mission-critical endpoint based on the non-mission-critical endpoint's communication history with the mission critical endpoint. The management system may use the status of a non-mission-critical endpoint as a reflection of the status of a mission-critical endpoint.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 10A is a flowchart showing a process by which an administrator may configure a machine with a twin NIC through a combination of manual and programmatic steps;

FIG. 10D is a flowchart showing a process by which an application may request an action on a DKS endpoint without regard to whether or not the application is aware of the fact that the endpoint has been categorized as a mission critical endpoint;

FIG. 10F depicts a graphical user interface window that may be used by a network or system administrator to set assign an endpoint to be used as a mission critical twin endpoint for a mission critical endpoint in accordance with a preferred embodiment of the present invention;

FIGS. 11A-11E show some simplified pseudo-code that depicts the manner in which endpoint objects and action objects can be implemented.

DETAILED DESCRIPTION OF THE INVENTION

The present invention provides a methodology for managing a distributed data processing system. The manner in which the system management is performed is described further below in more detail after the description of the preferred embodiment of the distributed computing environment in which the present invention operates.

Figure 1:
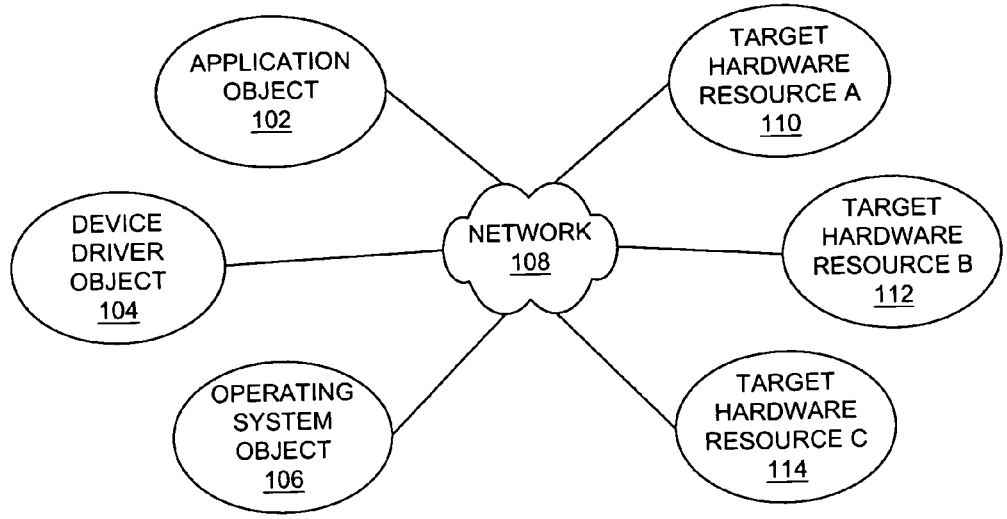
FIG. 1 is a diagram depicting a known logical configuration of software and hardware resources.

With reference now to FIG. 1, a diagram depicts a known logical configuration of software and hardware resources. In this example, the software is organized in an object-oriented system. Application object 102, device driver object 104, and operating system object 106 communicate across network 108 with other objects and with hardware resources 110-114.

In general, the objects require some type of processing, input/output, or storage capability from the hardware resources. The objects may execute on the same device to which the hardware resource is connected, or the objects may be physically dispersed throughout a distributed computing environment. The objects request access to the hardware resource in a variety of manners, e.g. operating system calls to device drivers. Hardware resources are generally available on a first-come, first-serve basis in conjunction with some type of arbitration scheme to ensure that the requests for resources are fairly handled. In some cases, priority may be given to certain requesters, but in most implementations, all requests are eventually processed.

Figure 2A:
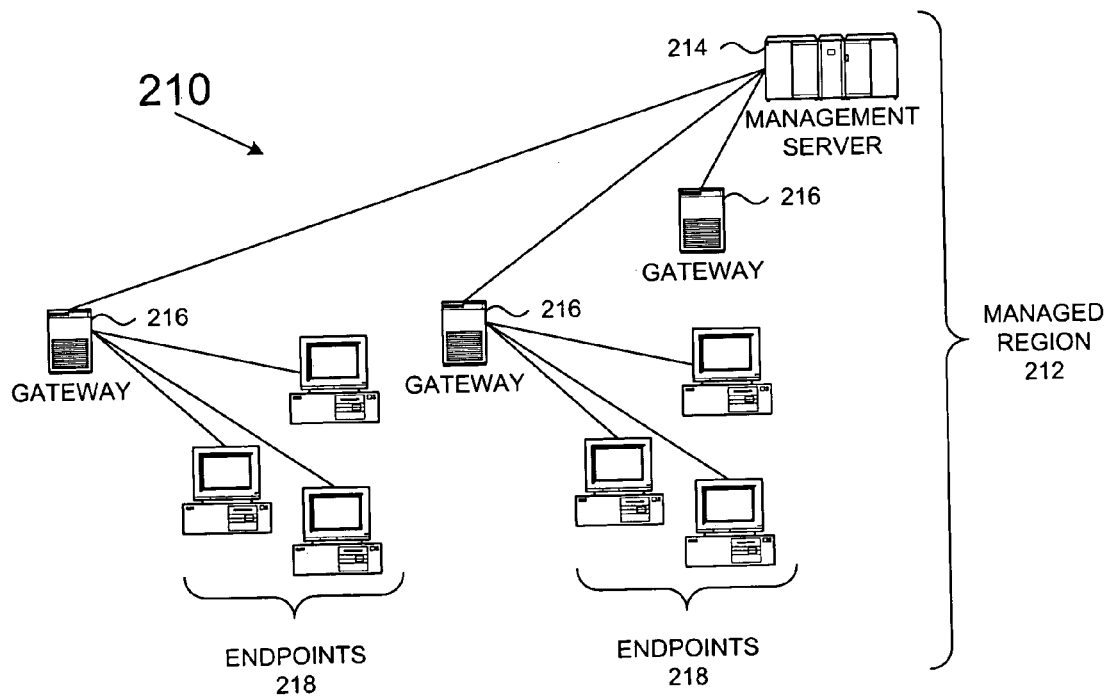
FIG. 2A is simplified diagram illustrating a large distributed computing enterprise environment in which the present invention is implemented.

With reference now to FIG. 2A, the present invention is preferably implemented in a large distributed computer environment 210 comprising up to thousands of "nodes". The nodes will typically be geographically dispersed and the overall environment is "managed" in a distributed manner. Preferably, the managed environment is logically broken down into a series of loosely connected managed regions (MRs) 212, each with its own management server 214 for managing local resources with the managed region. The network typically will include other servers (not shown) for carrying out other distributed network functions. These include name servers, security servers, file servers, thread servers, time servers and the like. Multiple servers 214 coordinate activities across the enterprise and permit remote management and operation. Each server 214 serves a number of gateway machines 216, each of which in turn support a plurality of endpoints/terminal nodes 218. The server 214 coordinates all activity within the managed region using a terminal node manager at server 214.

Figure 2B:
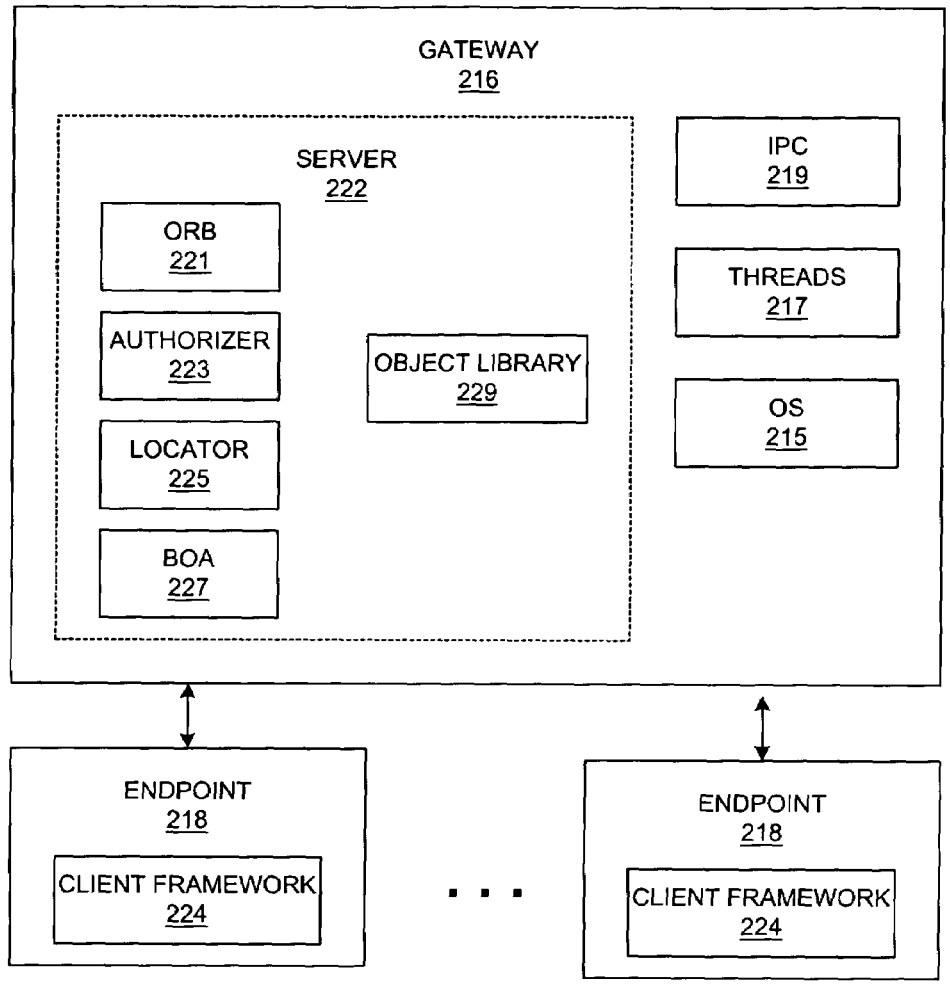
FIG. 2B is a block diagram of a preferred system management framework illustrating how the framework functionality is distributed across the gateway and its endpoints within a managed region.

With reference now to FIG. 2B, each gateway machine 216 runs a server component 222 of a system management framework. The server component 222 is a multi-threaded runtime process that comprises several components: an object request broker (ORB) 221, an authorization service 223, object location service 225 and basic object adapter (BOA) 227. Server component 222 also includes an object library 229. Preferably, ORB 221 runs continuously, separate from the operating system, and it communicates with both server and client processes through separate stubs and skeletons via an interprocess communication (IPC) facility 219. In particular, a secure remote procedure call (RPC) is used to invoke operations on remote objects. Gateway machine 216 also includes operating system 215 and thread mechanism 217.

The system management framework, also termed distributed kernel services (DKS), includes a client component 224 supported on each of the endpoint machines 218. The client component 224 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. It should be noted, however, that an endpoint may also have an ORB for remote object-oriented operations within the distributed environment, as explained in more detail further below.

Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like. In a preferred implementation, the object-oriented framework includes a Java runtime environment for well-known advantages, such as platform independence and standardized interfaces. Both gateways and endpoints operate portions of the system management tasks through cooperation between the client and server portions of the distributed kernel services.

In a large enterprise, such as the system that is illustrated in FIG. 2A, there is preferably one server per managed region with some number of gateways. For a workgroup-size installation, e.g., a local area network, a single server-class machine may be used as both a server and a gateway. References herein to a distinct server and one or more gateway(s) should thus not be taken by way of limitation as these elements may be combined into a single platform. For intermediate size installations, the managed region grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoints and gateways, and this mapping is preferably dynamic.

As noted above, there are one or more gateways per managed region. Preferably, a gateway is a fully managed node that has been configured to operate as a gateway. In certain circumstances, though, a gateway may be regarded as an endpoint. A gateway always has a network interface card (NIC), so a gateway is also always an endpoint. A gateway usually uses itself as the first seed during a discovery process. Initially, a gateway does not have any information about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

Figure 2C:
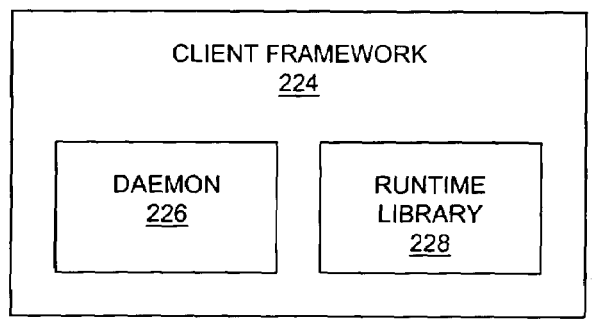
FIG. 2C is a block diagram of the elements that comprise the low cost framework (LCF) client component of the system management framework.

As also discussed above, the endpoint is a machine running the system management framework client component, which is referred to herein as a management agent. The management agent has two main parts as illustrated in FIG. 2C: daemon 226 and application runtime library 228. Daemon 226 is responsible for endpoint login and for spawning application endpoint executables. Once an executable is spawned, daemon 226 has no further interaction with it. Each executable is linked with application runtime library 228, which handles all further communication with the gateway.

Preferably, the server and each of the gateways is a distinct computer. For example, each computer may be a RISC System/6000™ (a reduced instruction set or so-called RISC-based workstation) running the AIX (Advanced Interactive Executive) operating system. Of course, other machines and/or operating systems may be used as well for the gateway and server machines.

Each endpoint is also a computing device. In one preferred embodiment of the invention, most of the endpoints are personal computers, e.g., desktop machines or laptops. In this architecture, the endpoints need not be high powered or complex machines or workstations. An endpoint computer preferably includes a Web browser such as Netscape Navigator or Microsoft Internet Explorer. An endpoint computer thus may be connected to a gateway via the Internet, an intranet or some other computer network.

Preferably, the client-class framework running on each endpoint is a low-maintenance, low-cost framework that is ready to do management tasks but consumes few machine resources because it is normally in an idle state. Each endpoint may be "dataless" in the sense that system management data is not stored therein before or after a particular system management task is implemented or carried out.

Figure 2D:
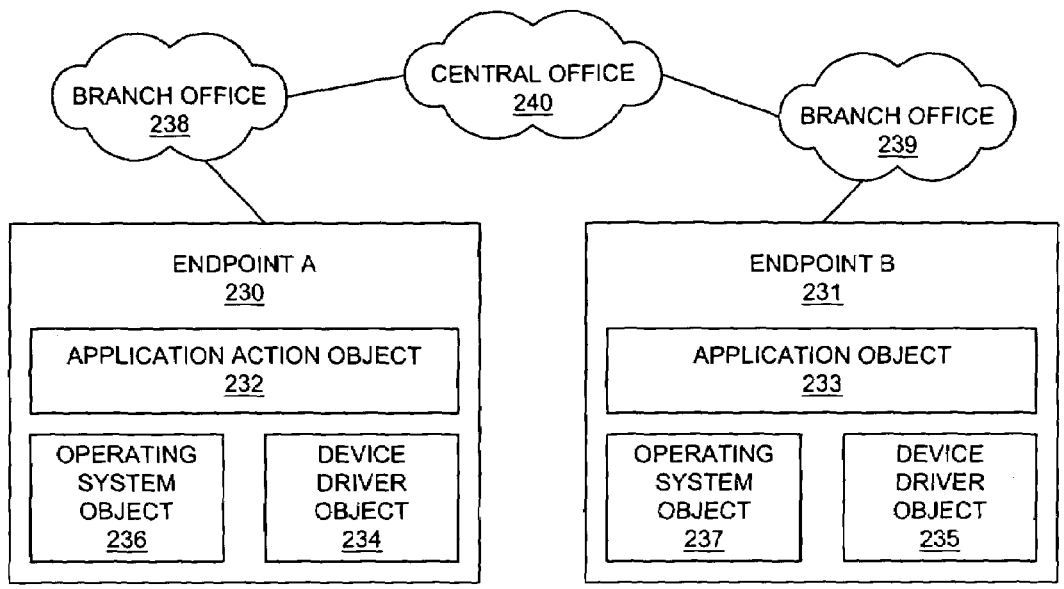
FIG. 2D is a diagram depicting a logical configuration of software objects residing within a hardware network similar to that shown in FIG. 2A.

With reference now to FIG. 2D, a diagram depicts a logical configuration of software objects residing within a hardware network similar to that shown in FIG. 2A. The endpoints in FIG. 2D are similar to the endpoints shown in FIG. 2B. Object-oriented software, similar to the collection of objects shown in FIG. 1, executes on the endpoints. Endpoints 230 and 231 support application action object 232 and application object 233, device driver objects 234-235, and operating system objects 236-237 that communicate across a network with other objects and hardware resources.

Resources can be grouped together by an enterprise into managed regions representing meaningful groups. Overlaid on these regions are domains that divide resources into groups of resources that are managed by gateways. The gateway machines provide access to the resources and also perform routine operations on the resources, such as polling. FIG. 2D shows that endpoints and objects can be grouped into managed regions that represent branch offices 238 and 239 of an enterprise, and certain resources are controlled by in central office 240. Neither a branch office nor a central office is necessarily restricted to a single physical location, but each represents some of the hardware resources of the distributed application framework, such as routers, system management servers, endpoints, gateways, and critical applications, such as corporate management Web servers. Different types of gateways can allow access to different types of resources, although a single gateway can serve as a portal to resources of different types.

Figure 2E:
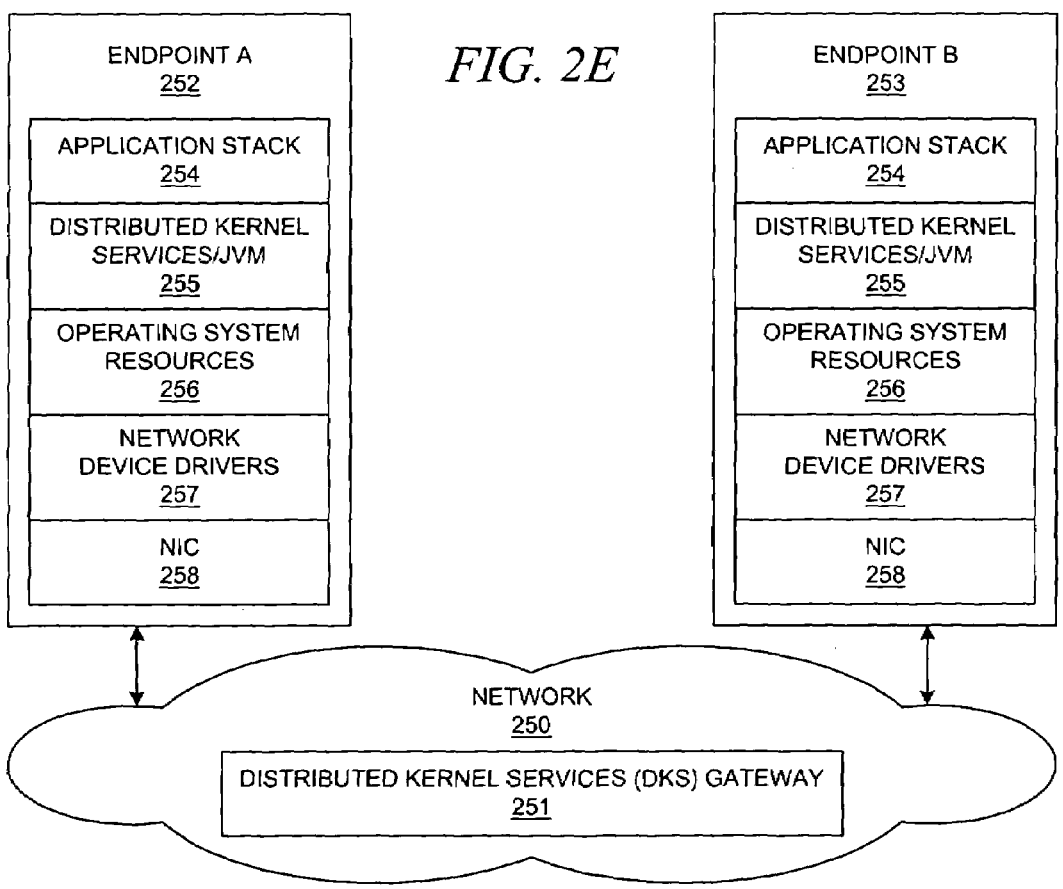
FIG. 2E is a diagram depicting the logical relationships between components within a system management framework that includes two endpoints and a gateway.

With reference now to FIG. 2E, a diagram depicts the logical relationships between components within a system management framework that includes two endpoints and a gateway. FIG. 2E shows more detail of the relationship between components at an endpoint. Network 250 includes gateway 251 and endpoints 252 and 253, which contain similar components, as indicated by the similar reference numerals used in the figure. An endpoint may support a set of applications 254 that use services provided by the distributed kernel services 255, which may rely upon a set of platform-specific operating system resources 256. Operating system resources may include TCP/IP-type resources, SNMP-type resources, and other types of resources. For example, a subset of TCP/IP-type resources may be a line printer (LPR) resource that allows an endpoint to receive print jobs from other endpoints. Applications 254 may also provide self-defined sets of resources that are accessible to other endpoints. Network device drivers 257 send and receive data through NIC hardware 258 to support communication at the endpoint.

Figure 2F:
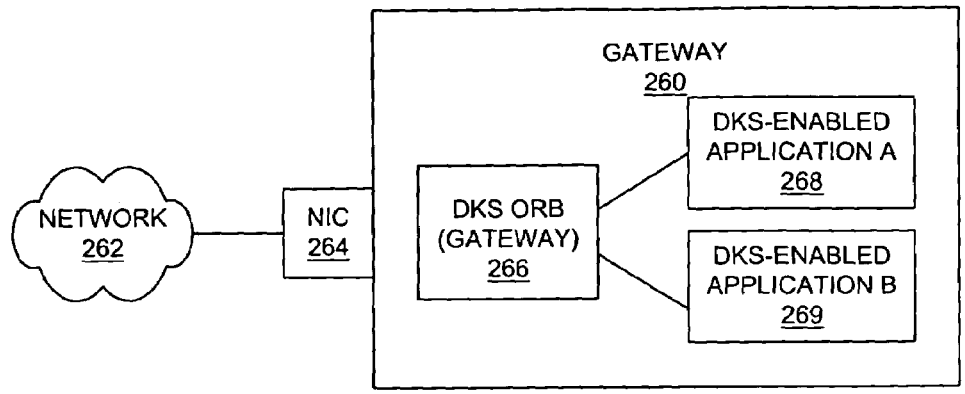
FIG. 2F is a diagram depicting the logical relationships between components within a system management framework that includes a gateway supporting two DKS-enabled applications.

With reference now to FIG. 2F, a diagram depicts the logical relationships between components within a system management framework that includes a gateway supporting two DKS-enabled applications. Gateway 260 communicates with network 262 through NIC 264. Gateway 260 contains ORB 266 that supports DKS-enabled applications 268 and 269. FIG. 2F shows that a gateway can also support applications. In other words, a gateway should not be viewed as merely being a management platform but may also execute other types of applications.

Figure 2G:
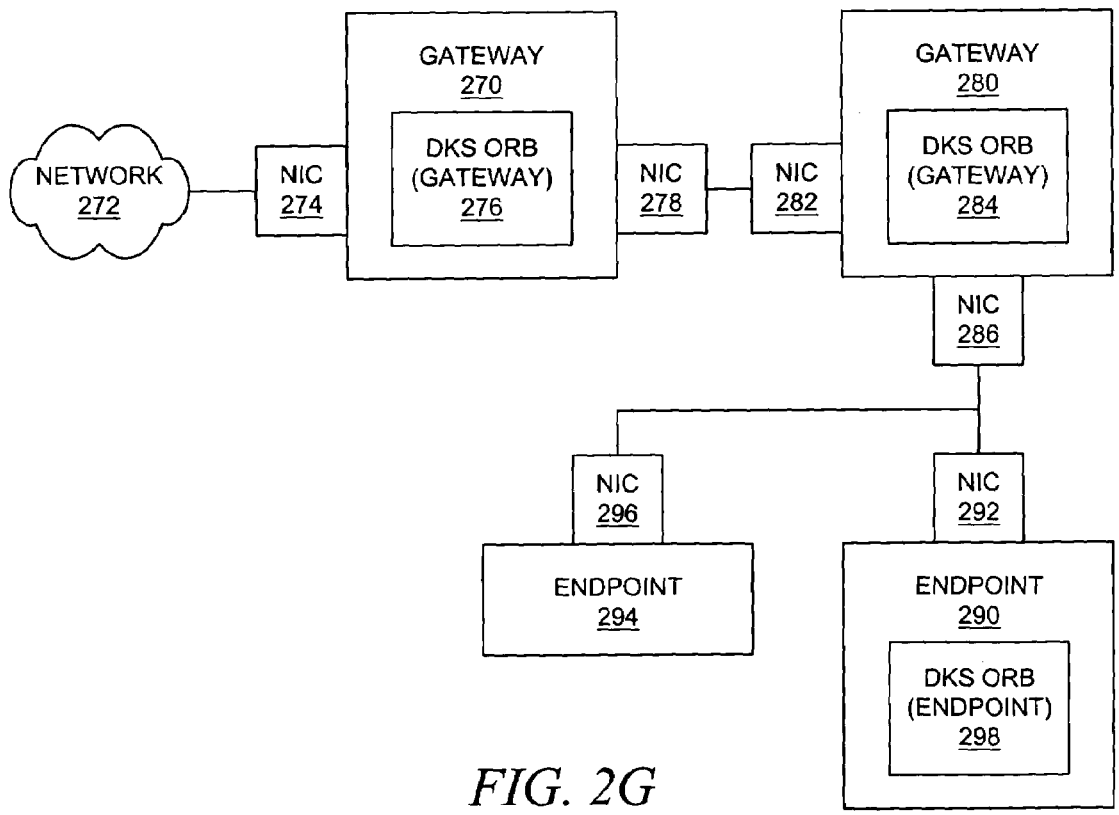
FIG. 2G is a diagram depicting the logical relationships between components within a system management framework that includes two gateways supporting two endpoints.

With reference now to FIG. 2G, a diagram depicts the logical relationships between components within a system management framework that includes two gateways supporting two endpoints. Gateway 270 communicates with network 272 through NIC 274. Gateway 270 contains ORB 276 that may provide a variety of services, as is explained in more detail further below. In this particular example, FIG. 2G shows that a gateway does not necessarily connect with individual endpoints.

Gateway 270 communicates through NIC 278 and network 279 with gateway 280 and its NIC 282. Gateway 280 contains ORB 284 for supporting a set of services. Gateway 280 communicates through NIC 286 and network 287 to endpoint 290 through its NIC 292 and to endpoint 294 through its NIC 296. Endpoint 290 contains ORB 298 while endpoint 294 does not contain an ORB. In this particular example, FIG. 2G also shows that an endpoint does not necessarily contain an ORB. Hence, any use of endpoint 294 as a resource is performed solely through management processes at gateway 280.

FIGS. 2F and 2G also depict the importance of gateways in determining routes/data paths within a highly distributed system for addressing resources within the system and for performing the actual routing of requests for resources. The importance of representing NICs as objects for an object-oriented routing system is described in more detail further below.

As noted previously, the present invention is directed to a methodology for managing a distributed computing environment. A resource is a portion of a computer system's physical units, a portion of a computer system's logical units, or a portion of the computer system's functionality that is identifiable or addressable in some manner to other physical or logical units within the system.

Figure 3:
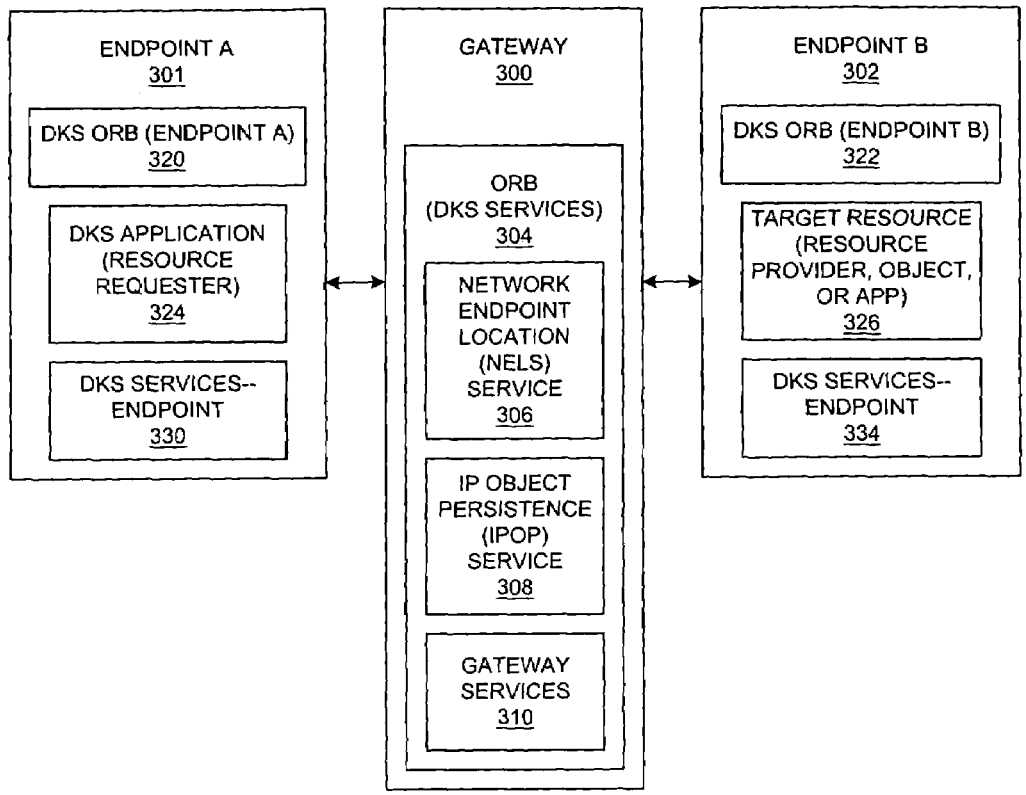
FIG. 3 is a block diagram depicting components within the system management framework that provide resource leasing management functionality within a distributed computing environment such as that shown in FIGS. 2D-2E.

With reference now to FIG. 3, a block diagram depicts components within the system management framework within a distributed computing environment such as that shown in FIGS. 2D-2E. A network contains gateway 300 and endpoints 301 and 302. Gateway 302 runs ORB 304. In general, an ORB can support different services that are configured and run in conjunction with an ORB. In this case, distributed kernel services (DKS) include Network Endpoint Location Service (NELS) 306, IP Object Persistence (IPOP) service 308, and Gateway Service 310.

The Gateway Service processes action objects, which are explained in more detail below, and directly communicates with endpoints or agents to perform management operations. The gateway receives events from resources and passes the events to interested parties within the distributed system. The NELS works in combination with action objects and determines which gateway to use to reach a particular resource. A gateway is determined by using the discovery service of the appropriate topology driver, and the gateway location may change due to load balancing or failure of primary gateways.

Other resource level services may include an SNMP (Simple Network Management Protocol) service that provides protocol stacks, polling service, and trap receiver and filtering functions. The SNMP Service can be used directly by certain components and applications when higher performance is required or the location independence provided by the gateways and action objects is not desired. A Metadata Service can also be provided to distribute information concerning the structure of SNMP agents.

The representation of resources within DKS allows for the dynamic management and use of those resources by applications. DKS does not impose any particular representation, but it does provide an object-oriented structure for applications to model resources. The use of object technology allows models to present a unified appearance to management applications and hide the differences among the underlying physical or logical resources. Logical and physical resources can be modeled as separate objects and related to each other using relationship attributes.

By using objects, for example, a system may implement an abstract concept of a router and then use this abstraction within a range of different router hardware. The common portions can be placed into an abstract router class while modeling the important differences in subclasses, including representing a complex system with multiple objects. With an abstracted and encapsulated function, the management applications do not have to handle many details for each managed resource. A router usually has many critical parts, including a routing subsystem, memory buffers, control components, interfaces, and multiple layers of communication protocols. Using multiple objects has the burden of creating multiple object identifiers (OIDs) because each object instance has its own OID. However, a first order object can represent the entire resource and contain references to all of the constituent parts.

Each endpoint may support an object request broker, such as ORBs 320 and 322, for assisting in remote object-oriented operations within the DKS environment. Endpoint 301 contains DKS-enabled application 324 that utilizes object-oriented resources found within the distributed computing environment. Endpoint 302 contains target resource provider object or application 326 that services the requests from DKS-enabled application 324. A set of DKS services 330 and 334 support each particular endpoint.

Applications require some type of insulation from the specifics of the operations of gateways. In the DKS environment, applications create action objects that encapsulate command which are sent to gateways, and the applications wait for the return of the action object. Action objects, contain all of the information necessary to run a command on a resource. The application does not need to know the specific protocol that is used to communicate with the resource. The application is unaware of the location of the resource because it issues an action object into the system, and the action object itself locates and moves to the correct gateway. The location independence allows the NELS to balance the load between gateways independently of the applications and also allows the gateways to handle resources or endpoints that move or need to be serviced by another gateway.

The communication between a gateway and an action object is asynchronous, and the action objects provide error handling and recovery. If one gateway goes down or becomes overloaded, another gateway is located for executing the action object, and communication is established again with the application from the new gateway. Once the controlling gateway of the selected endpoint has been identified, the action object will transport itself there for further processing of the command or data contained in the action object. If it is within the same ORB, it is a direct transport. If it is within another ORB, then the transport can be accomplished with a "Moveto" command or as a parameter on a method call.

Queuing the action object on the gateway results in a controlled process for the sending and receiving of data from the IP devices. As a general rule, the queued action objects are executed in the order that they arrive at the gateway. The action object may create child action objects if the collection of endpoints contains more than a single ORB ID or gateway ID. The parent action object is responsible for coordinating the completion status of any of its children. The creation of child action objects is transparent to the calling application. A gateway processes incoming action objects, assigns a priority, and performs additional security challenges to prevent rogue action object attacks. The action object is delivered to the gateway that must convert the information in the action object to a form suitable for the agent. The gateway manages multiple concurrent action objects targeted at one or more agents, returning the results of the operation to the calling managed object as appropriate.

In the preferred embodiment, potentially leasable target resources are Internet protocol (IP) commands, e.g. pings, and Simple Network Management Protocol (SNMP) commands that can be executed against endpoints in a managed region. Referring again to FIGS. 2F and 2G, each NIC at a gateway or an endpoint may be used to address an action object. Each NIC is represented as an object within the IPOP database, which is described in more detail further below.

The Action Object IP (AOIP) Class is a subclass of the Action Object Class. AOIP objects are the primary vehicle that establishes a connection between an application and a designated IP endpoint using a gateway or stand-alone service. In addition, the Action Object SNMP (AOSnmp) Class is also a subclass of the Action Object Class. AOSnmp objects are the primary vehicle that establishes a connection between an application and a designated SNMP endpoint via a gateway or the Gateway Service. However, the present invention is primarily concerned with IP endpoints.

The AOIP class should include the following: a constructor to initialize itself; an interface to the NELS; a mechanism by which the action object can use the ORB to transport itself to the selected gateway; a mechanism by which to communicate with the SNMP stack in a stand-alone mode; a security check verification of access rights to endpoints; a container for either data or commands to be executed at the gateway; a mechanism by which to pass commands or classes to the appropriate gateway or endpoint for completion; and public methods to facilitate the communication between objects.

The instantiation of an AOIP object creates a logical circuit between an application and the targeted gateway or endpoint. This circuit is persistent until command completion through normal operation or until an exception is thrown. When created, the AOIP object instantiates itself as an object and initializes any internal variables required. An action object IP may be capable of running a command from inception or waiting for a future command. A program that creates an AOIP object must supply the following elements: address of endpoints; function to be performed on the endpoint, class, or object; and data arguments specific to the command to be run. A small part of the action object must contain the return end path for the object. This may identify how to communicate with the action object in case of a breakdown in normal network communications. An action object can contain either a class or object containing program information or data to be delivered eventually to an endpoint or a set of commands to be performed at the appropriate gateway. Action objects IP return back a result for each address endpoint targeted.

Using commands such as "Ping", "Trace Route", "Wake-On LAN", and "Discovery", the AOIP object performs the following services: facilitates the accumulation of metrics for the user connections; assists in the description of the topology of a connection; performs Wake-On LAN tasks using helper functions; and discovers active agents in the network environment.

The NELS service finds a route (data path) to communicate between the application and the appropriate endpoint. The NELS service converts input to protocol, network address, and gateway location for use by action objects. The NELS service is a thin service that supplies information discovered by the IPOP service. The primary roles of the NELS service are as follows: support the requests of applications for routes; maintain the gateway and endpoint caches that keep the route information; ensure the security of the requests; and perform the requests as efficiently as possible to enhance performance.

For example, an application requires a target endpoint (target resource) to be located. The target is ultimately known within the DKS space using traditional network values, i.e. a specific network address and a specific protocol identifier. An action object is generated on behalf of an application to resolve the network location of an endpoint. The action object asks the NELS service to resolve the network address and define the route to the endpoint in that network.

One of the following is passed to the action object to specify a destination endpoint: an EndpointAddress object; a fully decoded NetworkAddress object; and a string representing the IP address of the IP endpoint. In combination with the action objects, the NELS service determines which gateway to use to reach a particular resource. The appropriate gateway is determined using the discovery service of the appropriate topology driver and may change due to load balancing or failure of primary gateways. An "EndpointAddress" object must consist of a collection of at least one or more unique managed resource IDs. A managed resource ID decouples the protocol selection process from the application and allows the NELS service to have the flexibility to decide the best protocol to reach an endpoint. On return from the NELS service, an "AddressEndpoint" object is returned, which contains enough information to target the best place to communicate with the selected IP endpoints. It should be noted that the address may include protocol-dependent addresses as well as protocol-independent addresses, such as the virtual private network id and the IPOP Object ID. These additional addresses handle the case where duplicate addresses exist in the managed region.

When an action needs to be taken on a set of endpoints, the NELS service determines which endpoints are managed by which gateways. When the appropriate gateway is identified, a single copy of the action object is distributed to each identified gateway. The results from the endpoints are asynchronously merged back to the caller application through the appropriate gateways. Performing the actions asynchronously allows for tracking all results whether the endpoints are connected or disconnected. If the action object IP fails to execute an action object on the target gateway, NELS is consulted to identify an alternative path for the command. If an alternate path is found, the action object IP is transported to that gateway and executed. It may be assumed that the entire set of commands within one action object IP must fail before this recovery procedure is invoked.

Figure 4:
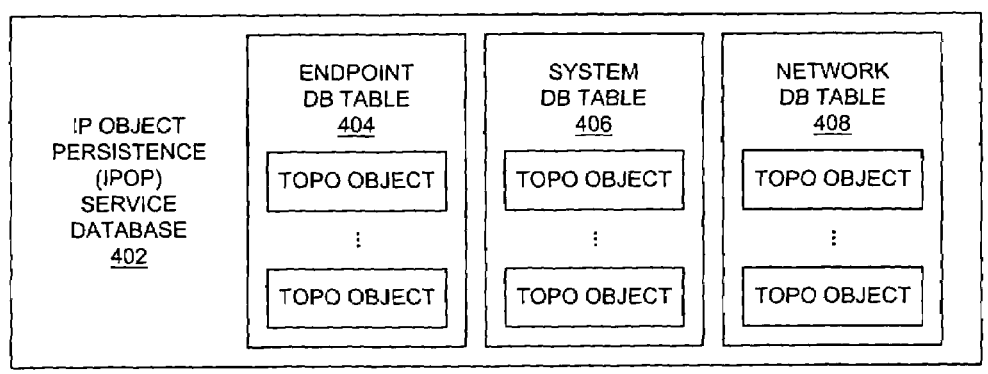
FIG. 4 is a block diagram showing data stored by a the IPOP (IP Object Persistence) service.

With reference now to FIG. 4, a block diagram shows the manner in which data is stored by the IPOP (IP Object Persistence) service. IPOP service database 402 contains endpoint database table 404, system database table 406, and network database table 408. Each table contains a set of topological (topo) objects for facilitating the leasing of resources at IP endpoints and the execution of action objects. Information within IPOP service database 402 allows applications to generate action objects for resources previously identified as IP objects through a discovery process across the distributed computing environment. FIG. 4 merely shows that the topo objects may be separated into a variety of categories that facilitate processing on the various objects. The separation of physical network categories facilitates the efficient querying and storage of these objects while maintaining the physical network relationships in order to produce a graphical user interface of the network topology.

Figure 5A:
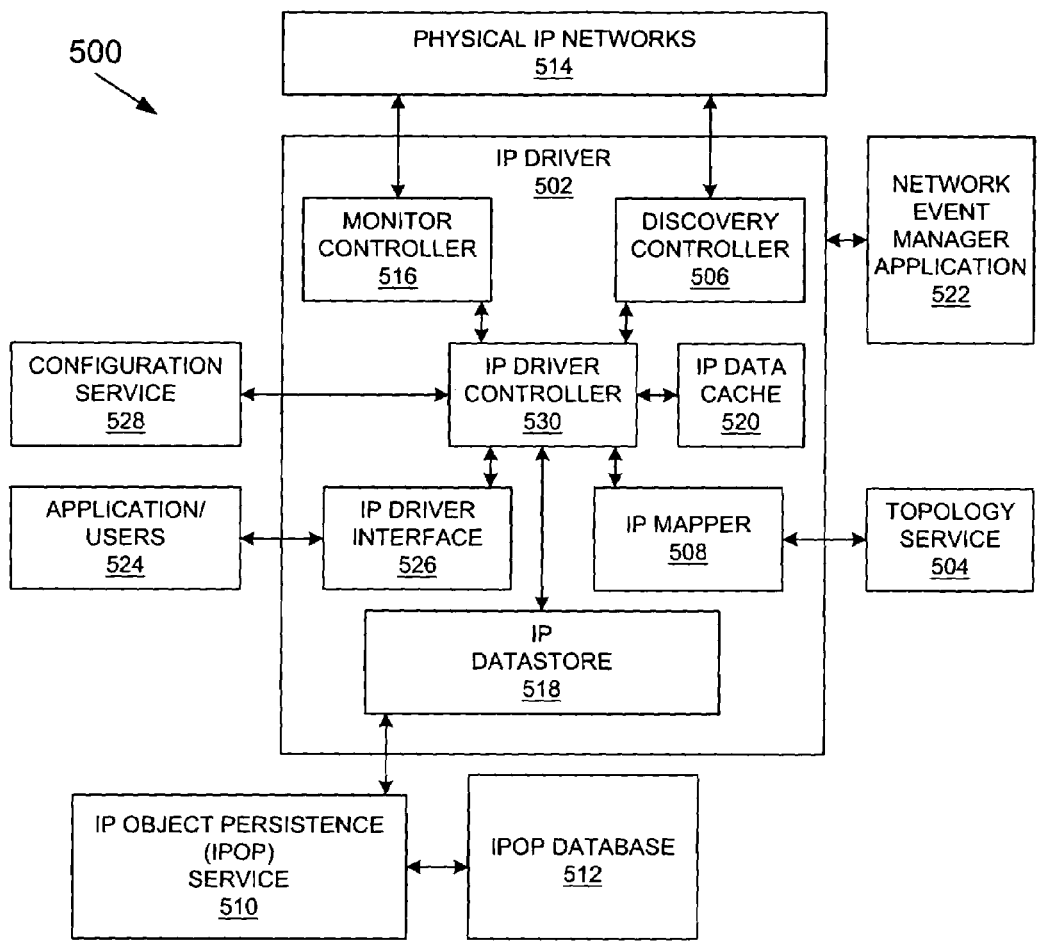
FIG. 5A is a block diagram showing the IPOP service in more detail.

With reference now to FIG. 5A, a block diagram shows the IPOP service in more detail. In the preferred embodiment of the present invention, an IP driver subsystem is implemented as a collection of software components for discovering, i.e. detecting, IP "objects", i.e. IP networks, IP systems, and IP endpoints by using physical network connections. This discovered physical network is used to create topology data that is then provided through other services via topology maps accessible through a graphical user interface (GUI) or for the manipulation of other applications. The IP driver system can also monitor objects for changes in IP topology and update databases with the new topology information. The IPOP service provides services for other applications to access the IP object database.

IP driver subsystem 500 contains a conglomeration of components, including one or more IP drivers 502. Every IP driver manages its own "scope", which is described in more detail further below, and every IP driver is assigned to a topology manager within Topology Service 504, which can serve may than one IP driver. Topology Service 504 stores topology information obtained from discovery controller 506. The information stored within the Topology Service may include graphs, arcs, and the relationships between nodes determined by IP mapper 508. Users can be provided with a GUI to navigate the topology, which can be stored within a database within the Topology Service.

IPOP service 510 provides a persistent repository 512 for discovered IP objects; persistent repository 512 contains attributes of IP objects without presentation information. Discovery controller 506 detects IP objects in Physical IP networks 514, and monitor controller 516 monitors IP objects. A persistent repository, such as IPOP database 512, is updated to contain information about the discovered and monitored IP objects. IP driver may use temporary IP data store component 518 and IP data cache component 520 as necessary for caching IP objects or storing IP objects in persistent repository 512, respectively. As discovery controller 506 and monitor controller 516 perform detection and monitoring functions, events can be written to network event manager application 522 to alert network administrators of certain occurrences within the network, such as the discovery of duplicate IP addresses or invalid network masks.

External applications/users 524 can be other users, such as network administrators at management consoles, or applications that use IP driver GUI interface 526 to configure IP driver 502, manage/unmanage IP objects, and manipulate objects in persistent repository 512. Configuration service 528 provides configuration information to IP driver 502. IP driver controller 532 serves as central control of all other IP driver components.

Referring back to FIG. 2G, a network discovery engine is a distributed collection of IP drivers that are used to ensure that operations on IP objects by gateways 260, 270, and 280 can scale to a large installation and provide fault-tolerant operation with dynamic start/stop or reconfiguration of each IP driver. The IPOP Service manages discovered IP objects; to do so, the IPOP Service uses a distributed database in order to efficiently service query requests by a gateway to determine routing, identity, or a variety of details about an endpoint. The IPOP Service also services queries by the Topology Service in order to display a physical network or map them to a logical network, which is a subset of a physical network that is defined programmatically or by an administrator. IPOP fault tolerance is also achieved by distribution of IPOP data and the IPOP Service among many Endpoint ORBs.

One or more IP drivers can be deployed to provide distribution of IP discovery and promote scalability of IP driver subsystem services in large networks where a single IP driver subsystem is not sufficient to discover and monitor all IP objects. Each IP discovery driver performs discovery and monitoring on a collection of IP resources within the driver's "scope". A driver's scope, which is explained in more detail below, is simply the set of IP subnets for which the driver is responsible for discovering and monitoring. Network administrators generally partition their networks into as many scopes as needed to provide distributed discovery and satisfactory performance.

A potential risk exists if the scope of one driver overlaps the scope of another, i.e., if two drivers attempt to discover/monitor the same device. Accurately defining unique and independent scopes may require the development of a scope configuration tool to verify the uniqueness of scope definitions. Routers also pose a potential problem in that while the networks serviced by the routers will be in different scopes, a convention needs to be established to specify to which network the router "belongs", thereby limiting the router itself to the scope of a single driver.

Some ISPs may have to manage private networks whose addresses may not be unique across the installation, like 10.0.0.0 network. In order to manage private networks properly, first, the IP driver has to be installed inside the internal networks in order to be able to discover and manage the networks. Second, since the discovered IP addresses may not be unique in across an entire installation that consists of multiple regions, multiple customers, etc., a private network ID has to be assigned to the private network addresses. In the preferred embodiment, the unique name of a subnet becomes "privateNetworkId\subnetAddress". Those customers that do not have duplicate networks address can just ignore the private network ID; the default private network ID is 0.

If Network Address Translator (NAT) is installed to translate the internal IP addresses to Internet IP addresses, users can install the IP drivers outside of NAT and manage the IP addresses inside the NAT. In this case, an IP driver will see only the translated IP addresses and discover only the IP addresses translated. If not all IP addresses inside the NAT are translated, an IP driver will not able to discover all of them. However, if IP drivers are installed this way, users do not have to configure the private network ID.

Scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The Configuration Service provides the services to allow the DKS components to store and retrieve configuration information for a variety of other services from anywhere in the networks. In particular, the scope configuration will be stored in the Configuration Services so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a Gateway. The system address is the address of one of the NICs that is used to make SNMP queries. A user interface can be provided, such as an administrator console, to write scope information into the Configuration Service. System administrators do not need to provide this information at all, however, as the IP drivers can use default values.

An IP driver gets its scope configuration information from the Configuration Service, which may be stored using the following format:

scopeID=driverID,anchorname,subnetAddress:subnetMask [:privateNetworkId:privateNetworkName:subnetPriority][, subnetAddress:subnetMask:privateNetworkId:privateNetworkName:subnetPriority]]

Typically, one IP driver manages only one scope. Hence, the "scopeID" and "driverID" would be the same. However, the configuration can provide for more than one scope managed by the same driver. "Anchorname" is the name in the name space in which the Topology Service will put the IP networks objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2. The scope configuration for IP Driver 2 from the Configuration Service would be: 2=2,ip, 147.0.0.0:255.254.0.0,146.100.0.0:255.255.0.0, 69.0.0.0:255.0.0.0.

| Subnet address | Subnet mask |
| --- | --- |
| 147.0.0.0 | 255.255.0.0 |
| 147.1.0.0 | 255.255.0.0 |
| 146.100.0.0 | 255.255.0.0 |
| 69.0.0.0 | 255.0.0.0 |

In general, an IP system is associated with a single IP address, and the "scoping" process is a straightforward association of a driver's ID with the system's IP address.

Routers and multi-homed systems, however, complicate the discovery and monitoring process because these devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface: the IP driver that manages the dominant interface will manage the router object so that the router is not being detected and monitored by multiple drivers; each interface is still managed by the IP driver determined by its scope; the IP address of the dominant interface will be assigned as the system address of the router or multi-homed system; and the smallest (lowest) IP address of any interface on the router will determine which driver includes the router object within its scope.

Users can customize the configuration by using the subnet priority in the scope configuration. The subnet priority will be used to determinate the dominant interface before using the lowest IP address. If the subnet priorities are the same, the lowest IP address is then used. Since the default subnet priority would be "0", then the lowest IP address would be used by default.

Figure 5B:
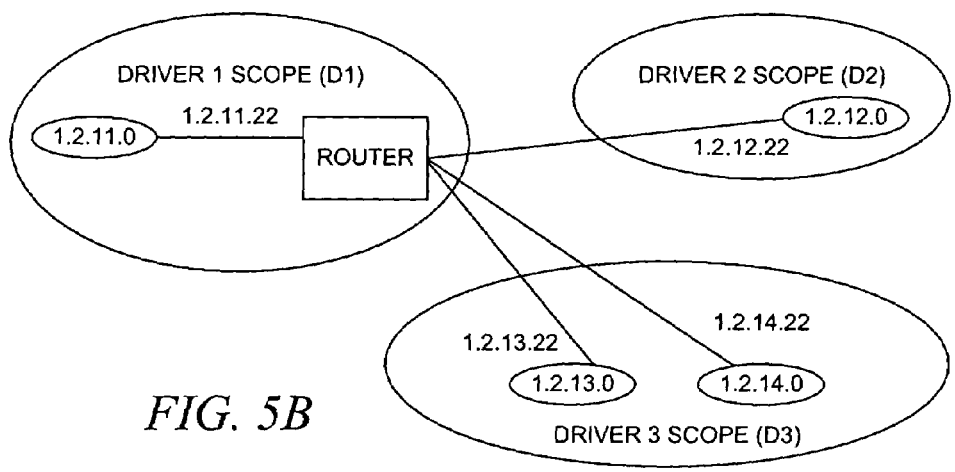
FIG. 5B is a network diagram depicting a set of routers that undergo a scoping process.

With reference now to FIG. 5B, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the Topology Service database.

If driver D1's entire subnet is removed from the router, driver D2 will become the new "owner" of the router object because the subnet address associated with driver D2 is now the lowest address on the router. Because there is no synchronization of information between the drivers, the drivers will self-correct over time as they periodically rediscover their resources. When the old driver discovers that it no longer owns the router, it deletes the router's information from the databases. When the new driver discovers the router's lowest subnet address is now within its scope, the new driver takes ownership of the router and updates the various data bases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. Based on the scopes, an IP driver can partition all IP networks, IP Systems, and IP endpoints into different scopes. A network and all its IP endpoints will always be assigned in the same scope. However, a router may be assigned to an IP Driver, but some of its interfaces are assigned to different to different IP drivers. The IP drivers that do not manage the router but manage some of its interfaces will have to create interfaces but not the router object. Since those IP drivers do not have a router object ID to assign to its managed interfaces, they will assign a unique system name instead of object ID in the IP endpoint object to provide a link to the system object in a different driver.

Because of the inter-scope association, when the IP Persistence Service (IPOP) is queried to find all the IP endpoints in system, it will have to search not only IP endpoints with the system ID but also IP endpoints with its system name. If a distributed IP Persistence Service is implemented, the IP Persistence Service has to provide extra information for searching among IP Persistence Services.

Figure 5C:
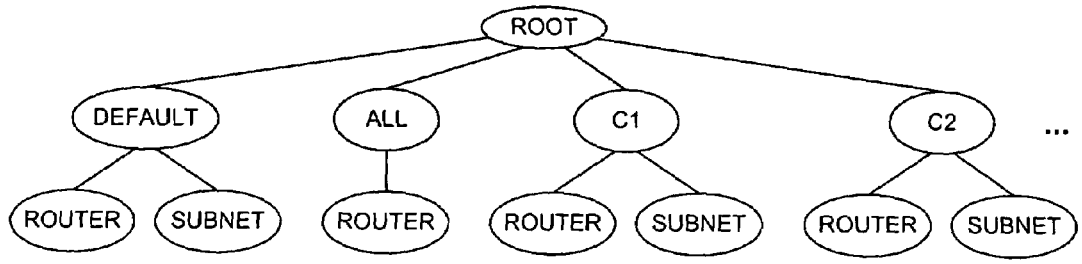
FIG. 5C depicts the IP Object Security Hierarchy.

An IP driver may use a Security Service to check the availability of the IP objects. In order to handle large number of objects, the Security Service requires the users to provide a naming hierarchy as the grouping mechanism. FIG. 5C, described below, shows a security naming hierarchy of IP objects. An IP driver has to allow users to provide security down to the object level and to achieve high performance. In order to achieve this goal, the concepts of "anchor" and "unique object name" are introduced. An anchor is a name in the naming space which can be used to plug in IP networks. Users can define, under the anchor, scopes that belong to the same customer or to a region. The anchor is then used by the Security Service to check if an user has access to the resource under the anchor. If users want the security group define inside a network, the unique object name is used. A unique object name is in the format of:

IP network—privateNetworkID/binaryNetworkAddress
IP system—privateNetworkID/binaryIPAddress/system
IP endpoint—privateNetworkID/binaryNetworkAddress/endppoint For example:

A network "146.84.28.0:255.255.255.0" in privateNetworkID 12 has unique name:
12/1/0/0/1/0/0/1/0/0/1/0/1/0/1/0/0/0/0/1/1/1/0/0.

A system "146.84.28.22" in privateNetworkID 12 has unique name:
12/1/0/0/1/0/0/1/0/0/1/0/1/0/1/0/0/0/0/0/1/1/1/0/0/0/0/0/1/0/1/1/0/system.

An endpoint "146.84.28.22" in privateNetworkId 12 has unique name:
12/1/0/0/1/0/0/1/0/0/1/0/1/0/1/0/0/0/0/0/1/1/1/0/0/0/0/0/1/0/1/1/0/endpoint.

By using an IP-address, binary-tree, naming space, one can group all the IP addresses under a subnet in the same naming space that need to be checked by the Security Service.

For example, one can set up all IP addresses under subnet "146.84.0.0:255.255.0.0" under the naming space 12/1/0/0/1/0/0/1/0/0/1/0/1/0/1/1/0/0 and set the access rights based on this node name.

With reference now to FIG. 5C, the IP Object Security Hierarchy is depicted. Under the root, there are two fixed security groups. One is "default" and the other is "all". The name of "default" can be configured by within the Configuration Service. Users are allowed to configure which subnets are under which customer by using the Configuration Service.

Under the first level security group, there are router groups and subnet groups. Those systems that have only one interface will be placed under the subnets group. Those systems that have more than one interface will be placed under the router group; a multi-home system will be placed under the router group.

Every IP object has a "securityGroup" field to store which security group it is in. The following describes how security groups are assigned.

When a subnet is created and it is not configured for any customers, its securityGroup is "/default/subnet/subnetAddress". When a subnet is created and it is configured in the "customer1" domain, its "securityGroup" value is "/customer1/subnet/subnetAddress".

When an IP endpoint is created and it is not configured for any customers, its "securityGroup" value is "/default/subnet/subnetAddress". The subnet address is the address of the subnet in which the IP endpoint is located. When an IP endpoint is created and it is configured in the "customer1" domain, its "securityGroup" value is "/customer1/subnet/subnetAddress". The subnet address is the address of the subnet in which the IP endpoint is located.

When a single interface IP system is created, it has the same "securityGroup" value that its interface has. When a router or multi-home system is created, the "securityGroup" value depends on whether all of the interfaces in the router or multi-home system are in the same customer group or not. If all of the interfaces of the router or multi-home system are in the same customer group, e.g., "customer1", its "securityGroup" value is "/customer1/router". If the interfaces of the router or multi-home system are in more than one domain, its "securityGroup" value is "/all/router".

These are the default security groups created by an IP driver. After the security group is created for an object, IP driver will not change the security group unless a customer wants to change it.

The IP Monitor Controller, shown in FIG. 5A, is responsible for monitoring the changes of IP topology and objects; as such, it is a type of polling engine, which is discussed in more detail further below. An IP driver stores the last polling times of an IP system in memory but not in the IPOP database. The last polling time is used to calculate when the next polling time will be. Since the last polling times are not stored in the IPOP database, when an IP Driver initializes, it has no knowledge about when the last polling times occurred. If polling is configured to occur at a specific time, an IP driver will do polling at the next specific polling time; otherwise, an IP driver will spread out the polling in the polling interval.

The IP Monitor Controller uses SNMP polls to determine if there have been any configuration changes in an IP system. It also looks for any IP endpoints added to or deleted from an IP system. The IP Monitor Controller also monitors the statuses of IP endpoints in an IP system. In order to reduce network traffic, an IP driver will use SNMP to get the status of all IP endpoints in an IP system in one query unless an SNMP agent is not running on the IP system. Otherwise, an IP driver will use "Ping" instead of SNMP. An IP driver will use "Ping" to get the status of an IP endpoint if it is the only IP endpoint in the system since the response from "Ping" is quicker than SNMP.

Figure 6:
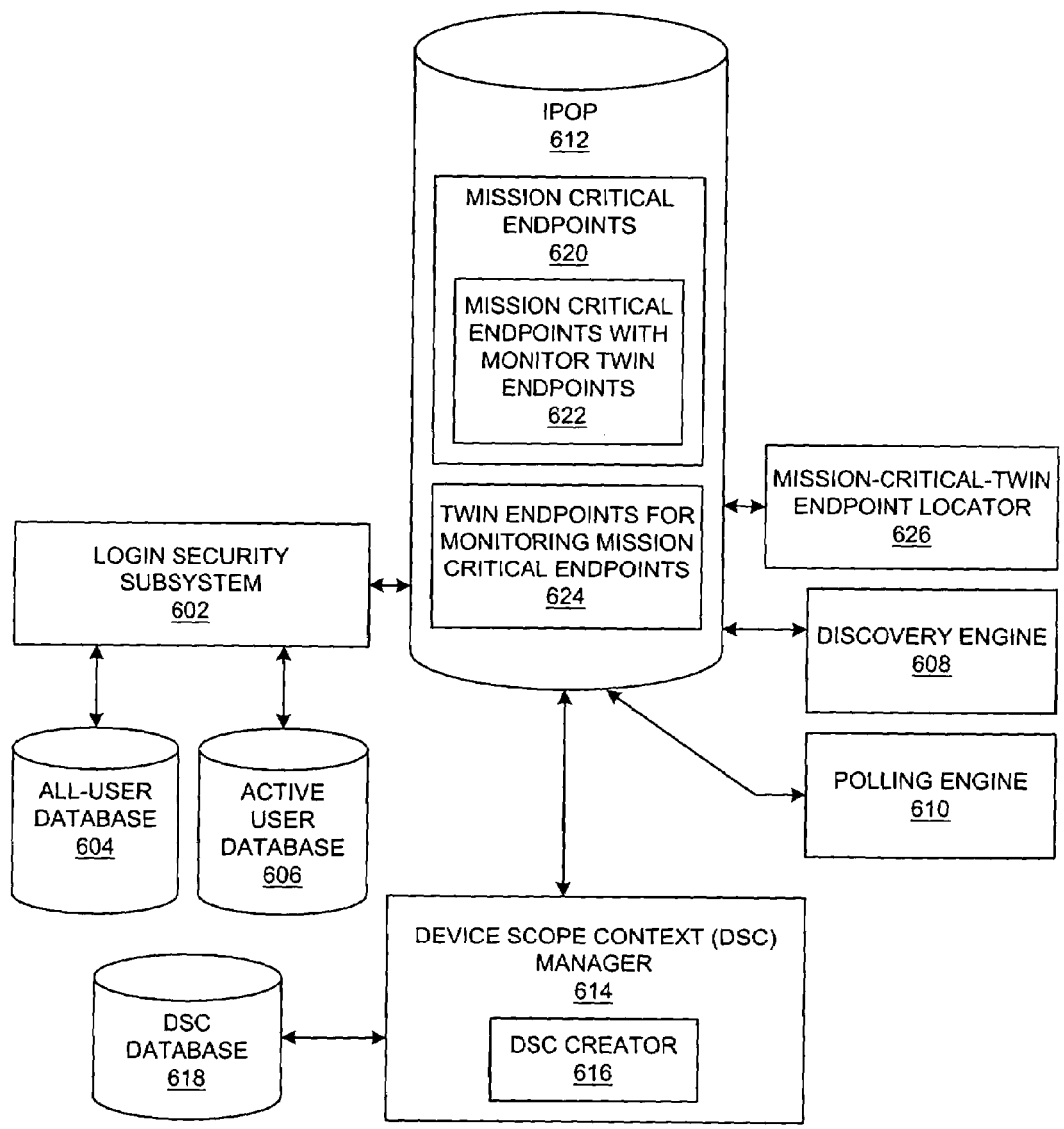
FIG. 6 is a block diagram showing a set of components that may be used to implement adaptive discovery and adaptive polling in accordance with a preferred embodiment of the present invention.

With reference now to FIG. 6, a block diagram shows a set of components that may be used to implement adaptive discovery and adaptive polling in accordance with a preferred embodiment of the present invention. Login security subsystem 602 provides a typical authentication service, which may be used to verify the identity of users during a login process. All-user database 604 provides information about all users in the DKS system, and active user database 606 contains information about users that are currently logged into the DKS system.

Discovery engine 608, similar to discovery controller 506 in FIG. 5, detects IP objects within an IP network. Polling engine, similar to monitor controller 516 in FIG. 5, monitors IP objects. A persistent repository, such as IPOP database 612, is updated to contain information about the discovered and monitored IP objects. IPOP also obtains the list of all users from the security subsystem which queries its all-users database 604 when initially creating a DSC. During subsequent operations to map the location of a user to an ORB, the DSC manager will query the active user database 606.

The DSC manager queries IPOP for all endpoint data during the initial creation of DSCs and any additional information needed, such as decoding an ORB address to an endpoint in IPOP and back to a DSC using the IPOPOid, the ID of a network object as opposed to an address.

As explained in more detail further below with respect to FIG. 8, an administrator will fill out the security information with respect to access user or endpoint access and designate which users and endpoints will have a DSC. If not configured by the administrator, the default DSC will be used. While not all endpoints will have an associated DSC, IPOP endpoint data 612, login security subsystem 602, and security information 604 are needed in order to create the initial DSCs.

The DSC manager, acting as a DSC data consumer, explained in more detail further below, then listens on this data waiting for new endpoints or users or changes to existing ones. DSC configuration changes are advertised by a responsible network management application. Some configuration changes will trigger the creation of more DSCs, while others will cause DSC data in the DSC database to be merely updated.

All DSCs are stored in DSC database 618 by DSC creator 616, which also fetches DSCs upon configuration changes in order to determine whether or not a DSC already exists. The DSC manager primarily fetches DSCs from DSC database 618, but also adds runtime information, such as ORB ID, which is ultimately used to determine the manner in which the polling engine should adapt to the particular user or endpoint.

IPOP database 612 also stores information concerning mission critical endpoints 620, mission critical endpoints with twin endpoints 622, and twin endpoints for monitoring mission critical endpoints 624. This information is described in more detail with respect to FIGS. 10A-10E further below.

IPOP database 612 also stores information concerning non-mission critical endpoints 626 that have communicated with the mission critical endpoints. The mission critical information can be used by mission-critical-twin endpoint locator engine 628. This information is described in more detail with respect to FIGS. 12A-12B further below.

Figure 7A:
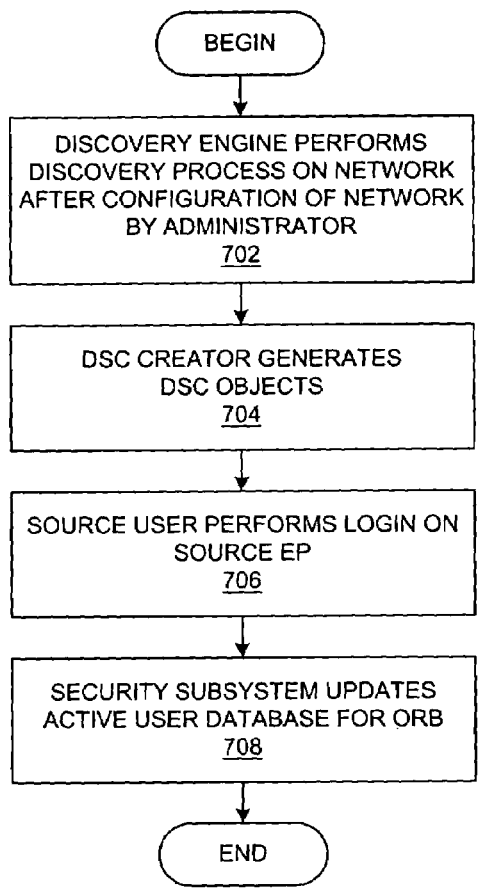
FIG. 7A is a flowchart depicting a portion of an initialization process in which a network management system prepares for adaptive discovery and adaptive polling in accordance with a preferred embodiment of the present invention.

With reference now to FIG. 7A, a flowchart depicts a portion of an initialization process in which a network management system prepares for adaptive discovery and adaptive polling in accordance with a preferred embodiment of the present invention. The process begins with the assumption that a network administrator has already performed configuration processes on the network such that configuration information is properly stored where necessary.

The discovery engine performs a discovery process to identify IP objects and stored those in the IPOP persistent storage (step 702). The DSC creator in the DSC manager generates "initial" DSC objects and stores these within the DSC database (step 704).

A source user then performs a login on a source endpoint (step 706). An application may use a resource, termed a target resource, located somewhere within the distributed system, as described above. Hence, the endpoint on which the target resource is located is termed the "target endpoint". The endpoint on which the application is executing is termed the "source endpoint" to distinguish it from the "target endpoint", and the user of the application is termed the "source user".

As part of the login process, the security subsystem updates the active user database for the ORB on which the application is executing (step 708). The initialization process is then complete.

Figure 7B:
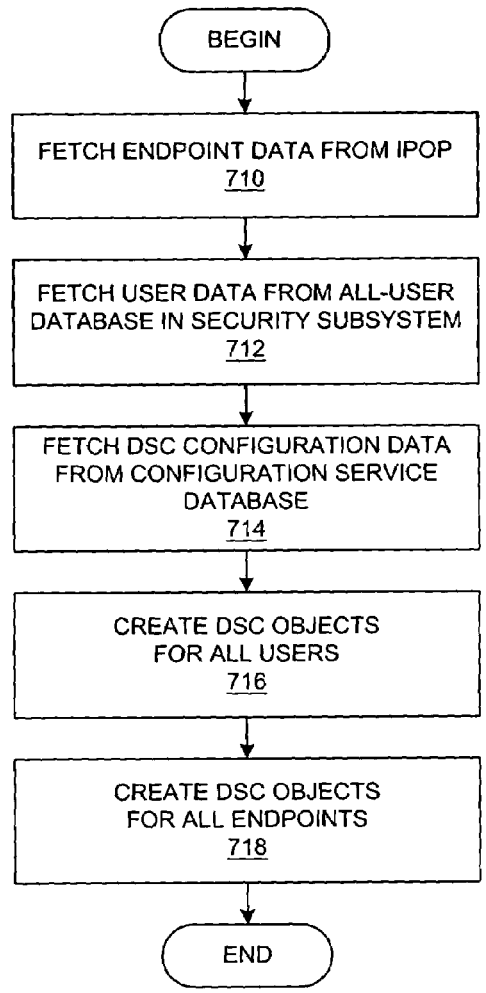
FIG. 7B is a flowchart depicting further detail of the initialization process in which the DSC objects are initially created and stored.

With reference now to FIG. 7B, a flowchart depicts further detail of the initialization process in which the DSC objects are initially created and stored. FIG. 7B provides more detail for step 704 shown in FIG. 7A.

The process shown in FIG. 7B provides an outline for the manner in which the DSC manager sets up associations between users and endpoints and between endpoints and endpoints. These associations are stored as special objects termed "DSC objects". A DSC object is created for all possible combinations of users and endpoints and for all possible combinations of endpoints and endpoints. From one perspective, each DSC object provides guidance on a one-to-one authorization mapping between two points in which a first point (source point) can be a user or an endpoint and a second point (target point) is an endpoint.

FIG. 7B depicts the manner in which the DSC manager initially creates and stores the DSC objects for subsequent use. At some later point in time, a user associated with an application executing on a source endpoint may request some type of network management action at a target endpoint, or a network management application may automatically perform an action at a target endpoint on behalf of a user that has logged into a source endpoint. Prior to completing the necessary network management task, the system must check whether the source user has the proper authorization to perform the task at the target endpoint.

Not all network monitoring and management tasks require that a user initiate the task. Some network management applications will perform tasks automatically without a user being logged onto the system and using the network management application. At some point in time, an application executing on a source endpoint may automatically attempt to perform an action at a target endpoint. Prior to completing the necessary network management task, the system must check whether the source endpoint has the proper authorization to perform the task at the target endpoint in a manner similar to the case of the source user performing an action at a target endpoint.

When the system needs to perform an authorization process, the previously created and stored DSC objects can be used to assist in the authorization process. By storing the DSC objects within a distributed database, a portion of the authorization process has already been completed. Hence, the design of the system has required a tradeoff between time and effort invested during certain system configuration processes and time and effort invested during certain runtime processes. A configuration process may require more time to complete while the DSC objects are created, but runtime authorization processes become much more efficient.

The DSC objects are created and stored within a distributed database during certain configuration processes throughout the system. A new system usually undergoes a significant installation and configuration process. However, during the life of the system, endpoints may be added or deleted, and each addition or deletion generally requires some type of configuration process. Hence, the DSC objects can be created or deleted as needed on an ongoing basis.

The present invention also provides an additional advantage by storing the DSC objects within a highly distributed database. Because the present invention provides a network management system for an application framework over a highly distributed data processing system, the system avoids centralized bottlenecks that could occur if the authorization processes had to rely upon a centralized security database or application. The first DSC fetch requires relatively more time than might be required with a centralized subsystem. However, once fetched, a DSC is cached until listeners on the configuration data signal that a change has occurred, at which point the DSC cache must be flushed.

The process in FIG. 7B begins with the DSC manager fetching endpoint data from the IPOP database (step 710). The IPOP database was already populated with IP objects during the discovery process, as mentioned in step 702 of FIG. 7A. The DSC manager fetches user data from the all-user database in the security subsystem (step 712). Configuration data is also fetched from the Configuration Service database or databases (step 714), such as ORB IDs that are subsequently used to fetch the ORB address. A network administration application will also use the configuration service to store information defined by the administrator. The DSC manager then creates DSC objects for each user/endpoint combination (step 716) and for each endpoint/endpoint combination (step 718), and the DSC object creation process is then complete.

Figure 7C:
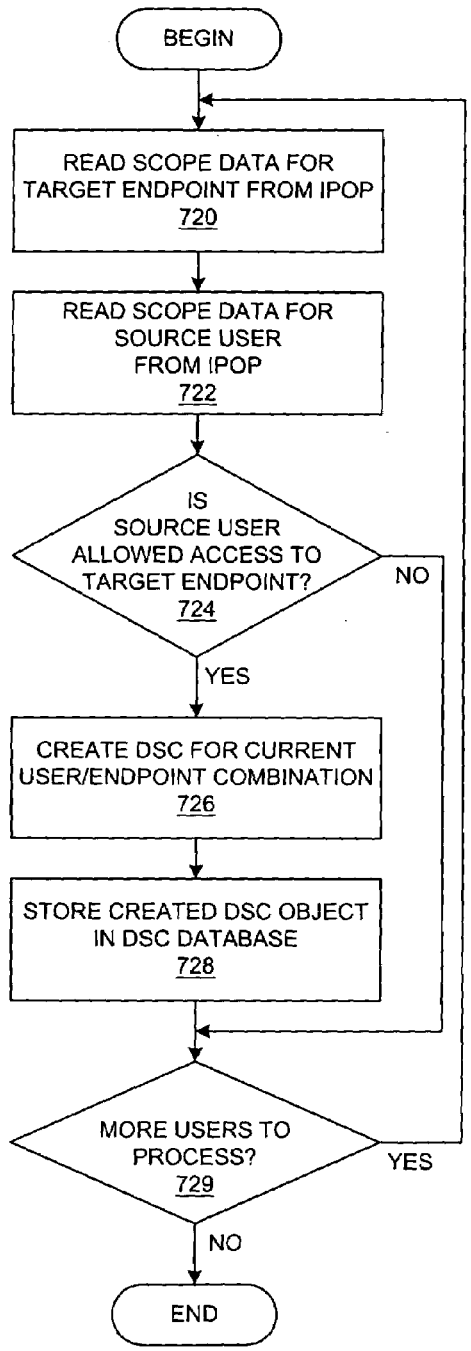
FIG. 7C is a flowchart depicting further detail of the initial DSC object creation process in which DSC objects are created and stored for an endpoint/user combination.

With reference now to FIG. 7C, a flowchart depicts further detail of the initial DSC object creation process in which DSC objects are created and stored for an endpoint/user combination. FIG. 7C provides more detail for step 716 in FIG. 7B. The process shown in FIG. 7C is a loop through all users that can be identified within the all-user database. In other words, a set of user accounts or identities have already been created and stored over time. However, all users that have been authorized to use the system do not have the same authorized privileges. The process shown in FIG. 7C is one of the first steps towards storing information that will allow the system to differentiate between users so that it can adaptively monitor the system based partially on the identity of the user for which the system is performing a monitoring task.

The process in FIG. 7C begins by reading scope data for a target endpoint from the IPOP database (step 720). The DSC creator within the DSC manager then reads scope data for a source user from the IPOP database (step 722). A determination is then made as to whether or not the source user is allowed to access the target endpoint (step 724). This determination can be made in the following manner. After the initial DSC is obtained, the source user information is used to make an authorization call to the security subsystem as to whether or not the source user has access to the security group defined in the DSC. It may be assumed that the security system can perform this function efficiently, although the present invention does not depend on auto-generation of security names or security trees. Once an authorization step is complete, the present system adapts the polling engine per the user/endpoint combination. The present invention should not be understood as depending upon any particular implementation of security authorization.

If not, then the process branches to check whether another user identity should be processed. If the source user is allowed to access the target endpoint, then a DSC object is created for the current source user and current target endpoint that are being processed (step 726). The DSC object is then stored within the DSC database (step 728), and a check is made as to whether or not another source user identity requires processing (step 729). If so, then the process loops back to get and process another user, otherwise the process is complete.

Figure 7D:
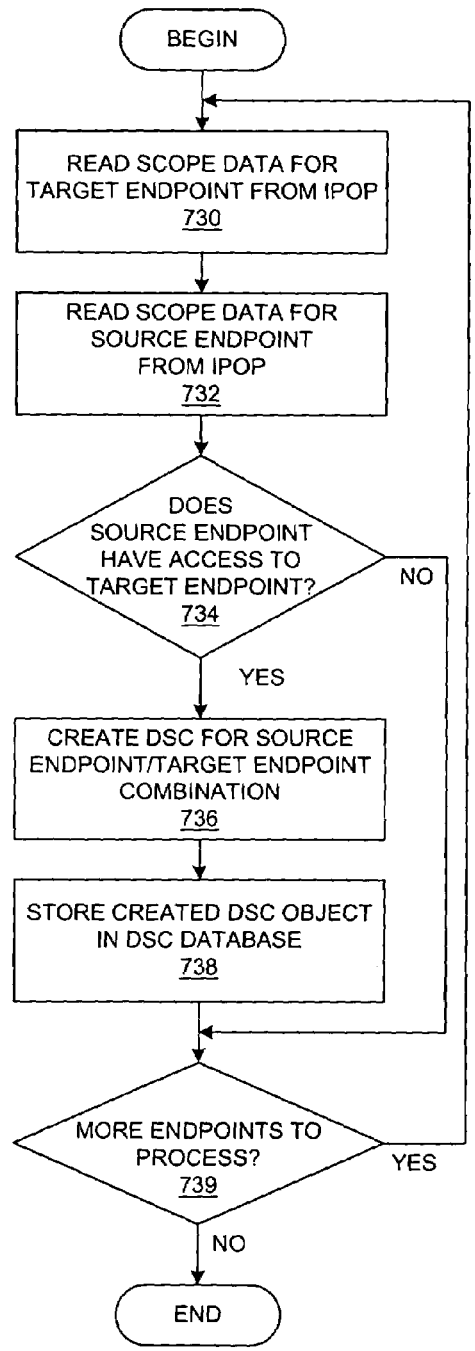
FIG. 7D is a flowchart depicting further detail of the initial DSC object creation process in which DSC objects are created and stored for an endpoint/endpoint combination.

With reference now to FIG. 7D, a flowchart depicts further detail of the initial DSC object creation process in which DSC objects are created and stored for an endpoint/endpoint combination. FIG. 7D provides more detail for step 718 in FIG. 7B. The process shown in FIG. 7D is a loop through all endpoints that can be identified within the IPOP database; the IPOP database was already populated with IP objects during the discovery process, as mentioned in step 702 of FIG. 7A. During runtime operations, an application executing on a source endpoint may attempt to perform an action at a target endpoint. However, not all endpoints within the system have access to requesting actions at all other endpoints within the system. The network management system needs to attempt to determine whether or not a source endpoint is authorized to request an action from a target endpoint. The process shown in FIG. 7D is one of the first steps towards storing information that will allow the system to differentiate between endpoints so that it can adaptively monitor the system based partially on the identity of the source endpoint for which the system is performing a monitoring task.

The process in FIG. 7D begins by reading scope data for a target endpoint from the IPOP database (step 730). The DSC creator within the DSC manager then reads scope data for a source endpoint from the IPOP database (step 732). A determination is then made as to whether or not the source endpoint is allowed to access the target endpoint (step 734) based on the scope defined in the DSC. For example, a simple scope of X.Y.Z.* will allow an address of X.Y.Z.Q access. If not, then the process branches to check whether another source endpoint should be processed. If the source endpoint is allowed to access the target endpoint, then a DSC object is created for the source endpoint and target endpoint that are currently being processed (step 736). The DSC object is then stored within the DSC database (step 738), and a check is made as to whether or not another source endpoint requires processing (step 739). If so, then the process loops back to get and process another endpoint, otherwise the process is complete.

The present invention is applicable to variety of uses, and the previous figures described a general manner in which a device scope context can be associated with a source user or a source endpoint. The following figures describe a particular use of the present invention in which DSCs are used to perform polling tasks associated with determining whether or not systems are up or down.

Figure 8A:
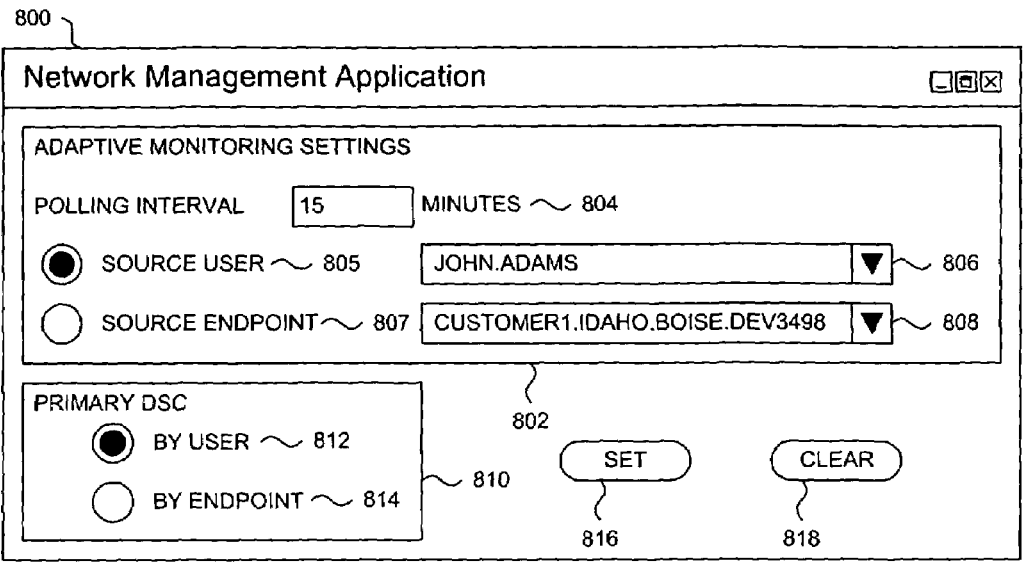
FIG. 8A depicts a graphical user interface window that may be used by a network or system administrator to set monitoring parameters for adaptive monitoring associated with users and endpoints in accordance with a preferred embodiment of the present invention.

With reference now to FIG. 8A, a figure depicts a graphical user interface window that may be used by a network or system administrator to set monitoring parameters for adaptive monitoring associated with users and endpoints in accordance with a preferred embodiment of the present invention. Window 800 shows a dialog box that is associated with a network management application. Input area 802 allows a system or network administrator to set polling intervals and to specify whether the polling intervals are to be associated with a user or with an endpoint. Input field 804 allows the user to input a numerical value for the polling interval, which is the length of time between polls of an endpoint. Radio button 805 allows an administrator to associate the polling interval with a specific user as specified by drop-down menu 806. Radio button 807 allows an administrator to associate the polling interval with a specific endpoint as specified by drop-down menu 808.

Input area 810 allows a system or network administrator to specify whether the user or the endpoint is to be used as a primary DSC. As described above, DSC objects are created for both a user/endpoint combination and an endpoint/endpoint combination. Radio buttons 812-814 allow the user to select whether the polling time intervals of associated with the user or associated with the endpoint are to be regarded as primary or controlling. If a user is logged onto to an ORB associated with an endpoint, such that it might be possible that the polling engine should poll on an interval associated with the network administrator, the selection of the primary DSC will determine whether the DSC should use the polling interval values associated with the user or the endpoint if available. Buttons 816 and 818 allow the user to set the values as necessary.

Figure 8C:
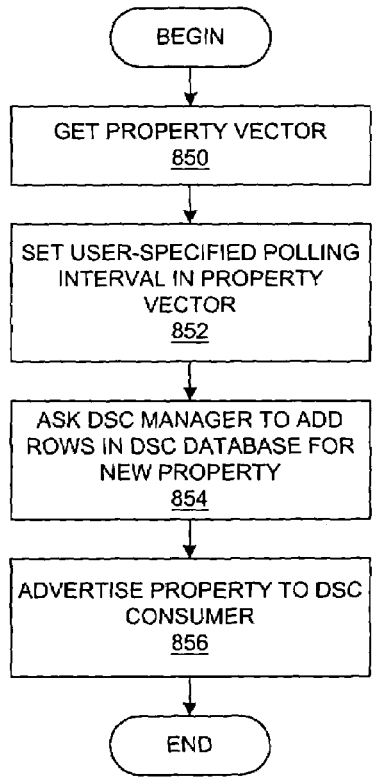
FIG. 8C is a flowchart showing a process by which a polling time property is added to a DSC after polling time parameters have been specified by an administrator.
Figure 8D:
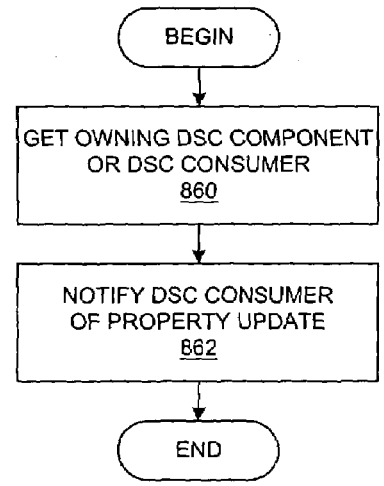
FIG. 8D is a flowchart showing a process for advertising newly specified polling time properties after polling time parameters have been specified by an administrator.
Figure 8B:
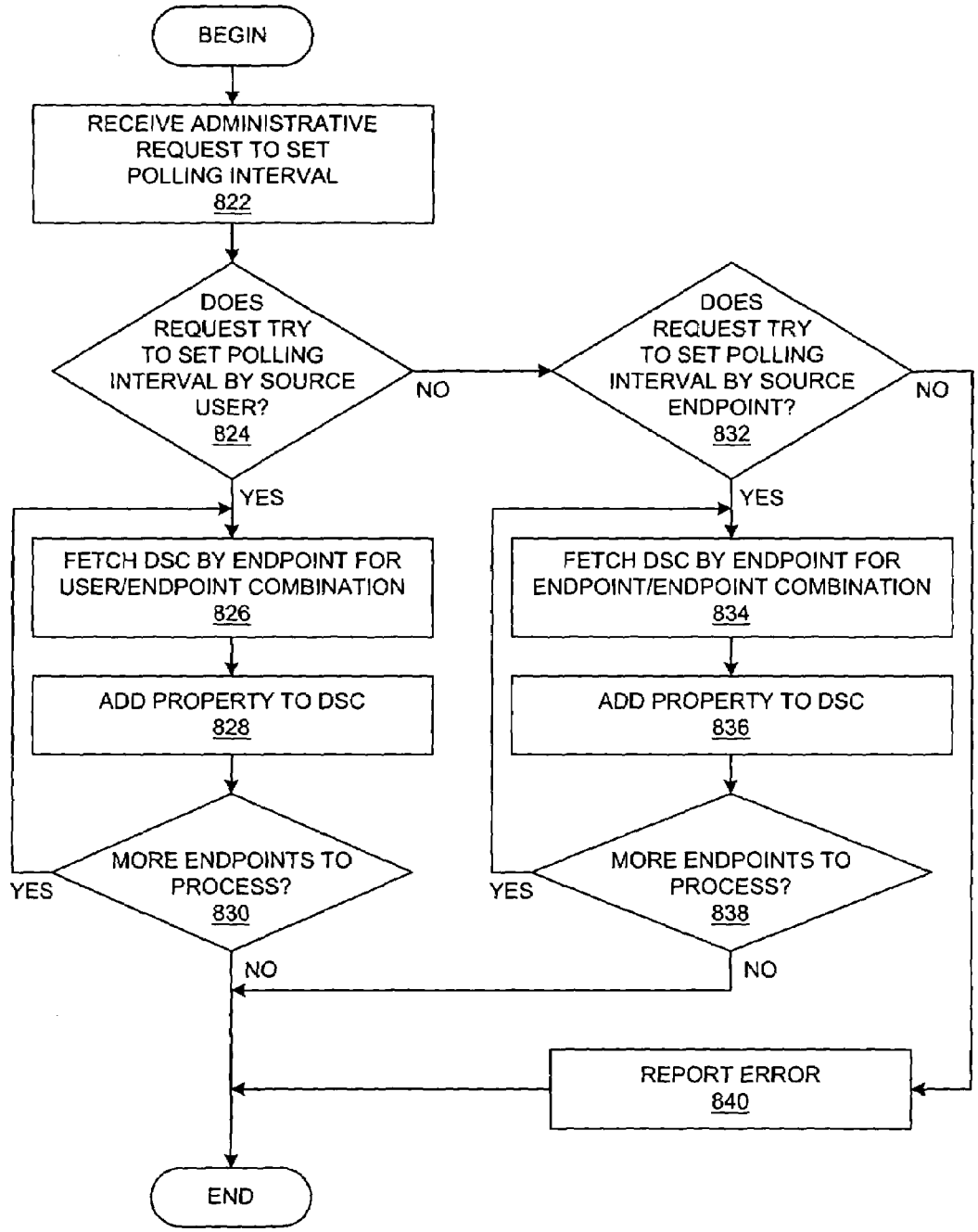
FIG. 8B is a flowchart showing a process by which the polling time parameters are set in the appropriate DSC objects after polling time parameters have been specified by an administrator.

With reference now to FIG. 8B, a flowchart shows a process by which the polling time parameters are set in the appropriate DSC objects after polling time parameters have been specified by an administrator. The process begins when the administrative application receives a request to set a polling interval (step 822), e.g., when a user enters a polling interval value in window 800 in FIG. 8A. A determination is then made as to whether or not the polling interval is to be associated with a source user (step 824). If so, the DSC manager fetches a DSC for a specified user/endpoint combination (step 826), and the new polling interval is added as a property to the DSC (step 828).

If the parameter is being associated with a user, as determined in step 824, then the process determines whether there are other target endpoints with which the polling interval should be associated (step 830). If so, then the process loops back to step 826 to process another user/endpoint combination. If not, then the process is complete for all user/endpoint combinations.

If it is determined that the polling interval is to be associated with a source endpoint (step 832), then the DSC manager fetches a DSC for a specified endpoint/endpoint combination (step 834), and the new polling interval is added as a property to the DSC (step 836). The process then determines whether there are other target endpoints with which the polling interval should be associated (step 838). If so, then the process loops back to step 834 to process another endpoint/endpoint combination. If not, then the process is complete for all endpoint/endpoint combinations.

If it is determined that the polling interval is not to be associated with a source endpoint at step 832, then the system can log or report an error (step 840), and the process is complete.

With reference now to FIG. 8C, a flowchart shows a process by which a polling time property is added to a DSC after polling time parameters have been specified by an administrator. The DSC manager gets a property vector from the DKS configuration service which has stored the values entered by the administrator in window 800 of FIG. 8A (step 850) and sets the user-specified polling interval in the property vector (step 852). In other words, the DSC manager and an administration application, such as that shown as window 800 in FIG. 8A, communicate via properties stored by the configuration service. The DSC manager is then instructed to add rows to the DSC database for the new property (step 854). The new property is advertised to "consumers" or users of the property, as needed (step 856), and the process is complete.

With reference now to FIG. 8D, a flowchart shows a process for advertising newly specified polling time properties after polling time parameters have been specified by an administrator. The process begins with the DSC manager determining the DSC component or DSC consumer of the newly specified property (step 860). The DSC consumer is then notified of the updated property (step 862), and the process is complete.

Figure 9A:
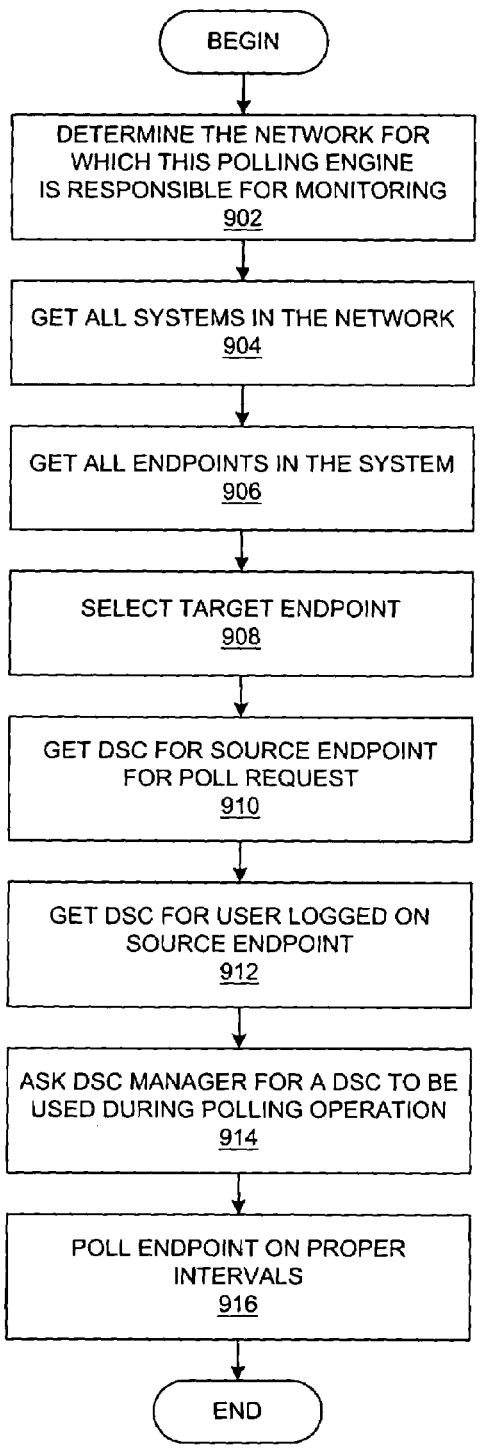
FIG. 9A is a flowchart showing a process used by a polling engine to monitor systems within a network after polling time parameters have been specified by an administrator.

With reference now to FIG. 9A, a flowchart shows a process used by a polling engine to monitor systems within a network after polling time parameters have been specified by an administrator. The process begins with the system determining the appropriate network for which the polling engine is responsible for monitoring (step 902). After the network is determined, then all of the systems within the network are identified (step 904), and all of the endpoints within those systems are identified (step 906). All of these data items are cached, as the polling engine will attempt to poll each of the endpoints on the appropriate intervals.

The polling engine then selects a target endpoint (step 908) to be polled. A DSC object for the source endpoint for the polling request is obtained (step 912), and a DSC object for the user logged on to the source endpoint is also obtained (step 912). The polling engine then requests the DSC manager for a DSC to be used during the polling operation (step 914). The polling engine then begins polling the target endpoint on the proper interval (step 916), and the process is complete.

It should be noted that the polling process may be continuous; for example, the administrator has requested that the administration application continually monitor the status of a certain set of devices. In other cases, the administrator may be performing "demand polling" on a more limited basis at the specific request of an administrator. Hence, the process shown in FIG. 9A may be part of a continuous loop through polling tasks.

Figure 9B:
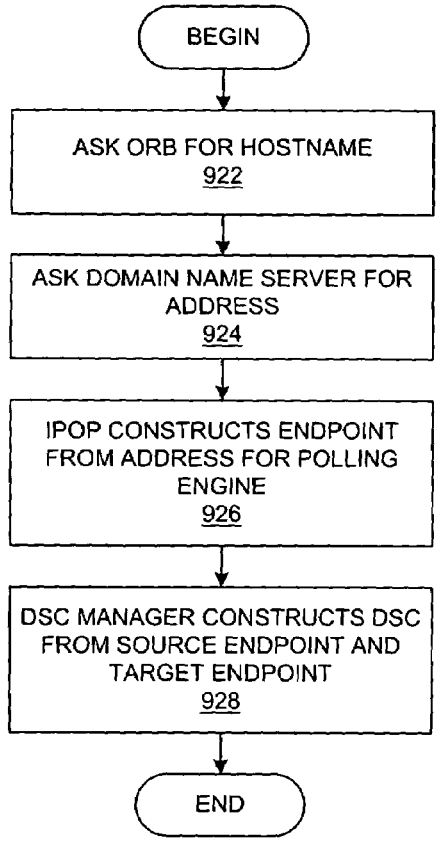
FIG. 9B is a flowchart showing a process used by a polling engine to get a DSC for a user/endpoint combination.

With reference now to FIG. 9B, a flowchart shows a process used by a polling engine to get a DSC for a user/endpoint combination. FIG. 9B provides more detail for step 910 in FIG. 9A. The process begins when the polling engine asks the ORB for a host name (step 922), and then the polling engine asks a domain name server for an address associated with the host name (step 924). The IPOP Service is requested to construct an endpoint from the address from the domain name server (step 926), and the DSC manager is requested to construct a DSC object from the source endpoint and the target endpoint (step 928). The process of obtaining this DSC is then complete.

Figure 9C:
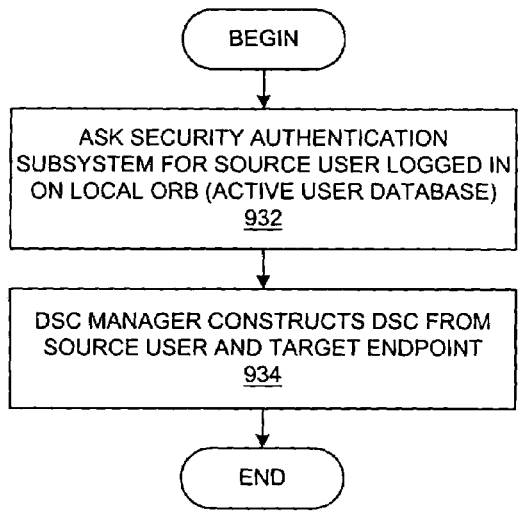
FIG. 9C is a flowchart showing a process used by a polling engine to get a DSC for an endpoint/endpoint combination.

With reference now to FIG. 9C, a flowchart shows a process used by a polling engine to get a DSC for an endpoint/endpoint combination. FIG. 9C provides more detail for step 912 in FIG. 9A. The process begins when the polling engine asks the security authentication subsystem for the source user that is logged onto the same ORB on which the polling engine resides (step 932). The DSC manager is requested to construct a DSC object for the source user and the target endpoint (step 934). The process of obtaining this DSC is then complete.

Figure 9D:
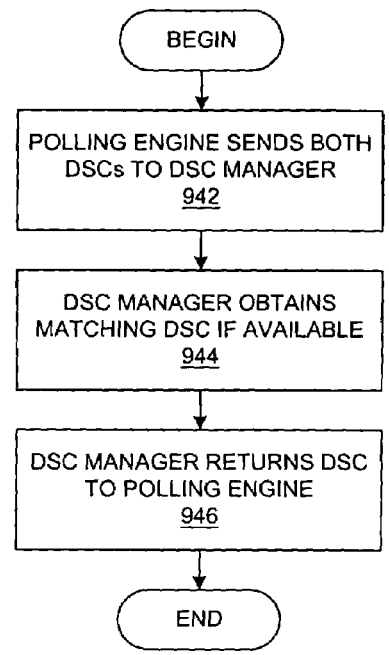
FIG. 9D is a flowchart showing a process used by a polling engine to get a DSC from the DSC manager.

With reference now to FIG. 9D, a flowchart shows a process used by a polling engine to get a DSC from the DSC manager. FIG. 9C provides more detail for step 914 in FIG. 9A. The process begins when the polling engine sends both newly constructed DSCs to the DSC manager (step 942), and the DSC manager searches for a DSC within the DSC database that matches one of the two newly constructed DSCs (step 944). While it is possible to have two matches, i.e. a user/endpoint match and an endpoint/endpoint match, the selection of a primary DSC, or similarly, the system enforcement of a default primary DSC, avoid collisions. The DSC manager then returns a matching DSC to the polling engine, if available, and the process is complete.

Figure 9E:
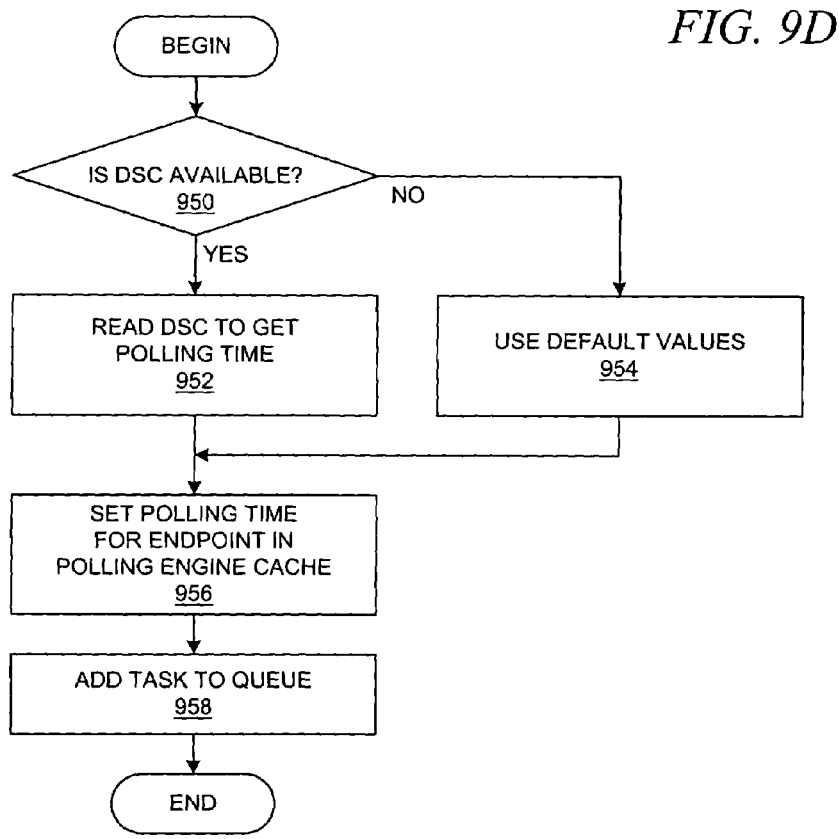
FIG. 9E is a flowchart showing a process used by a polling engine to queue a polling task.
Figure 9F:
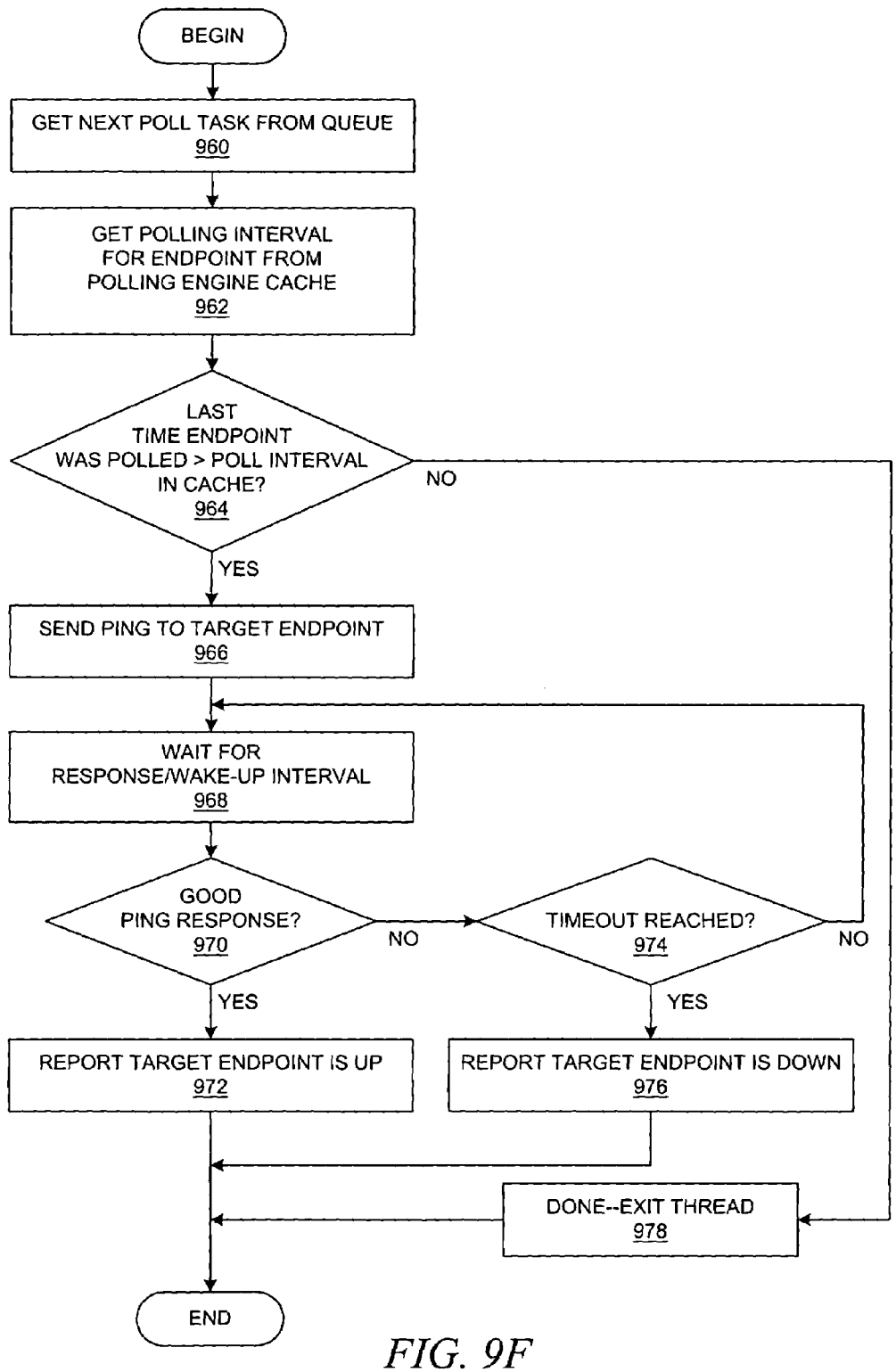
FIG. 9F is a flowchart showing a process used by a polling engine to perform a polling task on an endpoint.

With reference now to FIG. 9E, a flowchart shows a process used by a polling engine to queue a polling task. The process shown in FIG. 9E and FIG. 9F provides more detail for step 916 shown in FIG. 9A. The process begins when a check is made as to whether a matching DSC is available (step 950). If so, then the polling time interval is obtained from the DSC (step 952). If not, then the polling time interval is set to a default value for this or all endpoints (step 954). In either case, the polling engine stores the polling time interval in its cache for the endpoint (step 956). A task data structure for the poll action on the target endpoint is then queued (step 958), and the process is complete.

With reference now to FIG. 9F, a flowchart shows a process used by a polling engine to perform a polling task on an endpoint. Again, the process shown in FIG. 9E and FIG. 9F provides more detail for step 916 shown in FIG. 9A. The process begins by retrieving the next poll task from a task queue (step 960). As the polling engine's main function is to poll systems within the highly distributed network, the polling engine may have a component whose sole purpose is to manage the task queue as a large event loop. A set of execution threads within a thread pool can be used as a set of resources; each polling task can be placed on a separate thread. The threads can then be blocked, put to sleep, etc., while the thread awaits the completion of its task.

The time of the last poll of the target endpoint is then retrieved (step 962). The last poll time is then compared with the polling interval for the target endpoint, and a check is made as to whether or not enough time has passed since the last poll in accordance with the specified polling interval (step 964). If so, then a ping is sent to the target endpoint (step 966).

Before the polling engine asks the gateway for an application action object, such as application action object 232 shown in FIG. 2D, the polling engine asks the DSC manager for a DSC by giving the DSC manager the source endpoint and the target endpoint. The DSC manager then looks for matches with the user/target endpoint DSC and the source endpoint/target endpoint DSC in the DSC database. If no DSC exists, then the default DSC is returned to the polling engine. If two DSCs exist, then the DSC manager will determine whether to use the user/endpoint or endpoint/endpoint DSC based on the primary DSC defined by the administrator, as explained above. If the polling engine receives no DSC, then the action is not authorized and the polling engine does not unnecessarily ask the gateway for an application action object.

At a subsequent point in time, the thread that is being used for the polling task awakes (step 968), and a determination is made as to whether or not a good ping response has been received for the previous ping for this task (step 970). If so, then the polling engine can report or log that the target endpoint is operational, i.e. up (step 972), and the process for this poll task is complete.

If a good ping response has not been received, then a determination is made as to whether or not the ping has timed out (step 974). If so, then the polling engine can report or log that the target endpoint is not operational, i.e. down (step 976), and the process for this poll task is complete.

If the ping has not yet timed out at step 974, then the thread again waits for the response at step 968. If appropriate polling interval for this endpoint has not yet passed, then the endpoint should not yet be polled again, and the process branches to exit the thread (step 978) and process another task in the task queue.

The polling activities shown in FIGS. 9A-9F illustrate one particular management activity that may occur on a highly distributed data processing system, yet other management activities are possible. As noted previously, when management activities are performed at a particular machine, a significant amount of bandwidth may be consumed. In general, a service provider attempts to minimize the reduction of bandwidth that is caused by any system management activities while also attempting to increase the reliability of the system through fault-tolerant solutions.

Figure 10B:
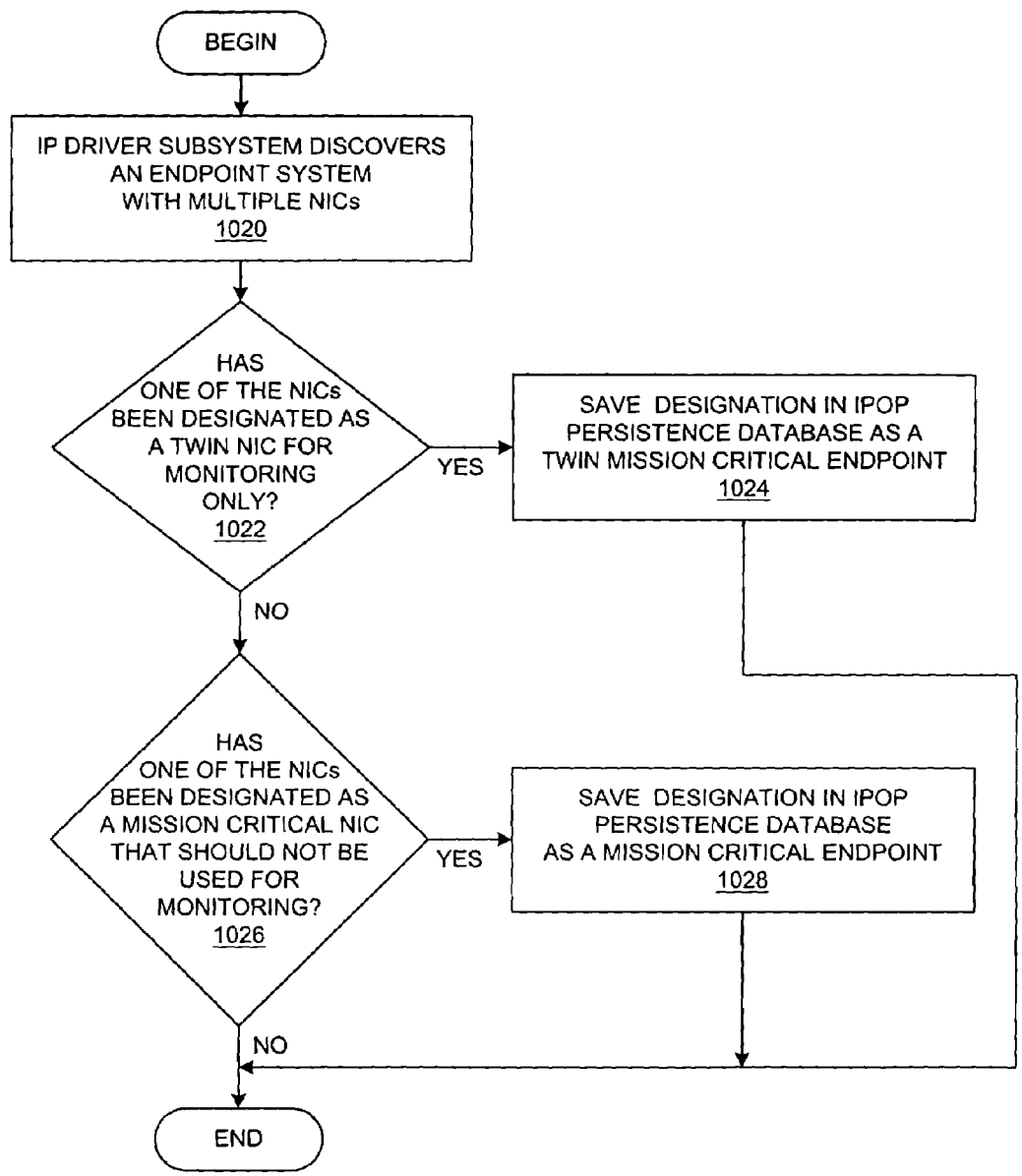
FIG. 10B is a flowchart showing a process by which a discovery process may be adjusted to detect twin NICs.
Figure 10C:
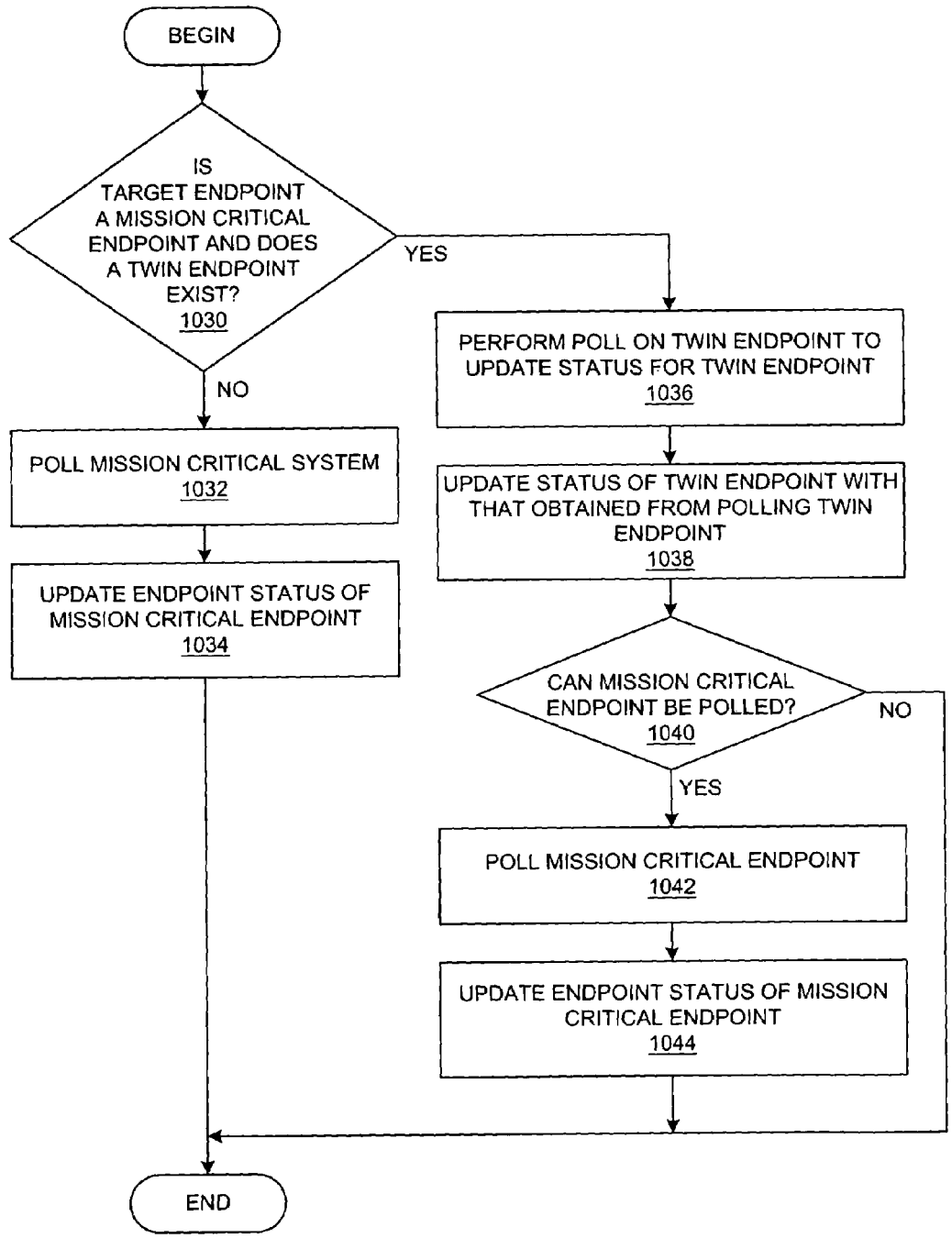
FIG. 10C is a flowchart showing a process by which a polling process may be adjusted when certain endpoints have been categorized as mission critical endpoints.
Figure 10E:
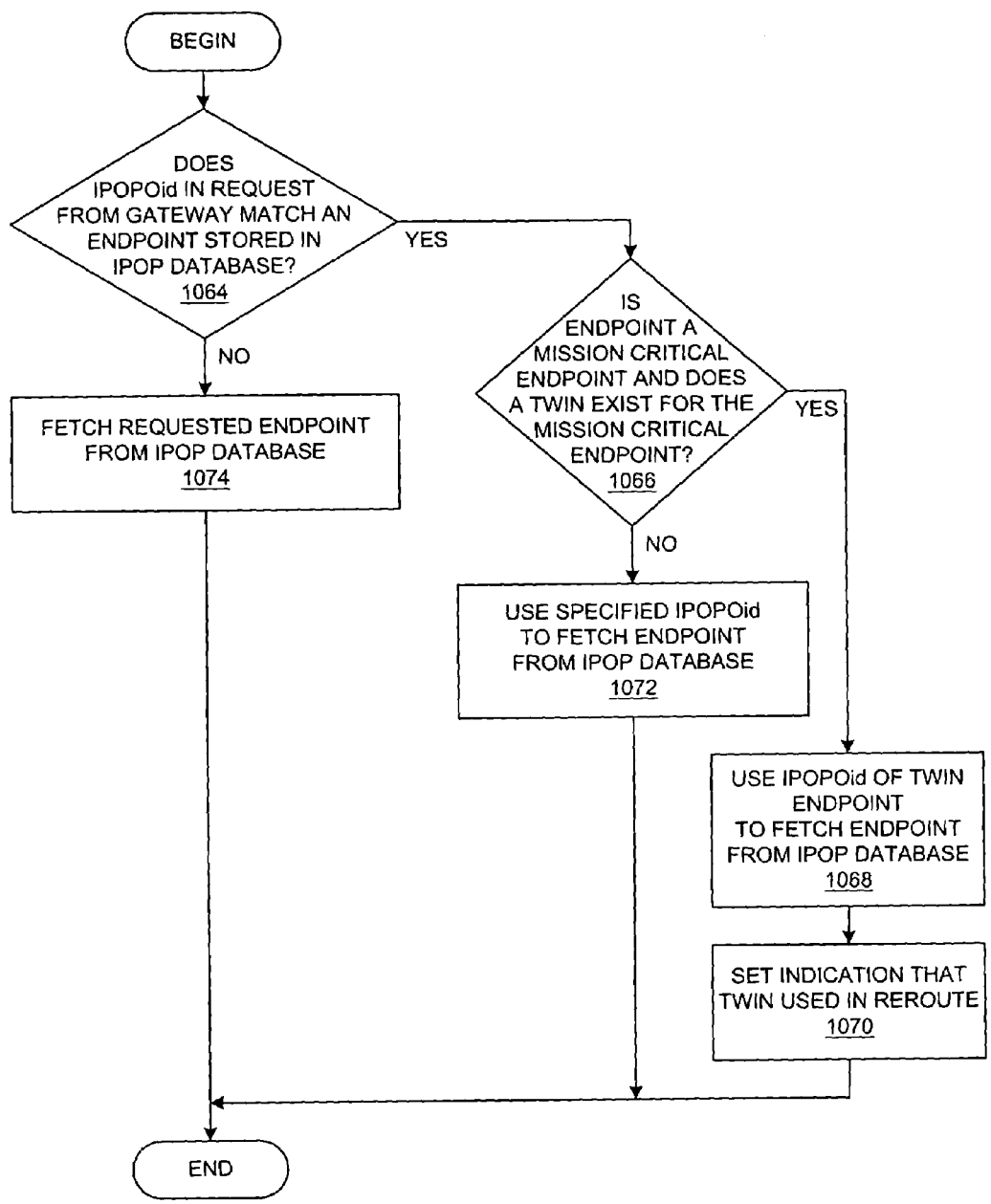
FIG. 10E is a flowchart showing a process by which the IPOP database performs a search to find an appropriate endpoint against which a requested action should be executed with consideration of whether the endpoint is a mission critical endpoint.

One manner of increasing reliability yet also maintaining performance of the distributed system would include providing plentiful IP addresses, which can be accomplished in several different ways, and installing a second NIC in some machines within the distributed system, which is a viable option as the cost of NICs decreases. The extra NIC in a given machine may be termed a "twin NIC". Any given NIC may then be categorized as being represented by a mission critical endpoint or a non-mission critical endpoint as determined by an administrator. The system may then perform management activities, such as polling, without regard to the manner in which a given endpoint has been categorized. After the NICs and endpoints have been configured, then various steps may be performed programmatically, as is described in more detail further below. FIGS. 10A-10B depict processes that may be combined with the processes described above with respect to FIGS. 7A-7D, while FIG. 10C depicts a process that may be combined with the polling process shown in FIG. 9F. FIGS. 10D-10E depict examples of processes that may be used to reroute the execution of action objects in a system that implements twin endpoints.

With reference now to FIG. 10A, a flowchart depicts a process by which an administrator may configure a machine with a twin NIC through a combination of manual and programmatic steps. The process begins with the administrator identifying mission critical endpoints (step 1002) and identifying non-mission critical actions that may be performed (step 1004). The administrator may then place extra, or "twin", NICs into mission critical systems (step 1006). Obviously, the placement of additional NICs is a manual process, and the steps of identifying and categorizing endpoints and actions are potentially a combination of manual steps and software-assisted user selectable actions within a network/system management application.

The administrator then configures the IP addresses of the additional NICs via the appropriate network management applications (step 1008), and the administrator may optionally configure hostnames and domain name servers for the modified systems (step 1010). The administrator then associates the newly added twin NICs with their corresponding mission critical NICs via the appropriate network management applications (step 1012), and the configuration process is complete.

With reference now to FIG. 10B, a flowchart depicts a process by which a discovery process may be adjusted to detect twin NICs. The process shown in FIG. 10B may occur during the discovery process depicted as step 702 in FIG. 7A. This portion of the discovery process begins when the IP driver subsystem discovers a system with multiple NICs (step 1020). A determination is then made as to whether one of the NICs has been designated as a twin NIC that is to be used for monitoring purposes only (step 1022). If so, then the process branches so that the designation is saved within the IPOP database as a twin mission critical endpoint (step 1024), and the process is complete. If the NIC has not been designated as a twin NIC that should be used for monitoring purposes only, then a determination is made as to whether one of the NICs has been designated as a mission critical NIC that should not be used for monitoring (step 1026). If so, then the process branches so that the designation is saved within the IPOP database as a mission critical endpoint (step 1028), and the process in complete. If an administrator has categorized none of the multiple NICs with a special designation, then the process is complete.

With reference now to FIG. 10C, a flowchart depicts a process by which a polling process may be adjusted when certain endpoints have been categorized as mission critical endpoints. In FIG. 9F, a polling engine sends a "Ping" action to an endpoint, and the polling engine then receives the status returned by the requested action, after which the status of the endpoint is updated. The process shown within FIG. 10C may be combined with the polling process shown in FIG. 9F. The process shown in FIG. 10C has a preliminary portion in which it is determined whether the endpoint that is to be polled has been given a special designation, a portion during which a polling action is performed, and a concluding portion in which the status of the endpoint is updated. Hence, it should be understood that the process shown in FIG. 10C could be combined with the process shown in FIG. 9F by performing the appropriate pre-polling steps prior to performing the polling action and then also performing the appropriate post-polling steps after performing the polling action. To distinguish the process shown in FIG. 10C from that shown in FIG. 9F, the process shown in FIG. 10C assumes that the target endpoint is a mission critical endpoint.

Referring now to FIG. 10C, the process begins with a determination as to whether the target endpoint is a mission critical endpoint and whether a twin endpoint exists for the target endpoint (step 1030). If both conditions are not true, then the polling engine polls the mission critical endpoint (step 1032) and updates the status of the mission critical endpoint (step 1034), and the process is complete. In that case, the mission critical endpoint has not been configured with a twin endpoint through which monitoring operations may be performed; hence, the bandwidth on the mission critical endpoint has not been reserved solely for mission critical actions, and the monitoring operation performed by the polling engine necessarily consumes some of the bandwidth from the mission critical endpoint.

If the target endpoint is a mission critical endpoint and a twin endpoint exists for the target endpoint, then the polling engine performs the polling action on the twin endpoint (step 1036) and updates the status of the twin endpoint when received (step 1038). A determination is then made as to whether or not the mission critical endpoint can be polled (step 1040). If so, then the polling engine also polls the mission critical endpoint (step 1042), and the endpoint status of the mission critical endpoint is updated when the status is received (step 1044). It should be noted the polling operation on the twin endpoint and the mission critical endpoint may be performing in parallel by executing the operation on separate threads.

In the case shown in steps 1036-1044, the mission critical endpoint has been configured with a twin endpoint through which monitoring operations may be performed, thereby preserving the bandwidth on the mission critical endpoint for mission critical actions, and the monitoring operation performed by the polling engine attempts to automatically limit the bandwidth consumed from the mission critical endpoint for monitoring operations.

With reference now to FIG. 10D, a flowchart depicts a process by which an application may request an action on a DKS endpoint without regard to whether or not the application is aware of the fact that the endpoint has been categorized as a mission critical endpoint. In FIGS. 10D-10E, the system management framework may reroute the action object to a non-mission critical endpoint, and the application that has requested the action should be able to continue processing without regard to the rerouting unless it is necessary for the application to do so.

The process begins when an application requests that a gateway perform an action on a DKS endpoint that is not mission critical (step 1050). The DKS endpoint gateway receives an IPOPOid from the application (step 1052), and the gateway asks IPOP to decode the address in the request (step 1054). DKS IPOP receives the IPOPOid and performs a search in the IPOP database to find the endpoint (step 1056). IPOP then returns a fetched endpoint within an APPLICATION_ACTION_OBJECT, described in more detail further below with respect to FIG. 11B, to the gateway that passes it back to the application (step 1058). The application can then perform the action within the returned object (step 1060), and the process is then complete. Hence, in this process, the application can perform an action, which may be rerouted, and the application does not necessarily have to be concerned with the fact that the action has been rerouted.

With reference now to FIG. 10E, a flowchart depicts a process by which the IPOP database performs a search to find an appropriate endpoint against which a requested action should be executed with consideration of whether the endpoint is a mission critical endpoint. FIG. 10E shows more detail for step 1056 in FIG. 10D. The process shown in FIG. 10E shows a series of steps in which the system determines whether to use an endpoint corresponding to the IPOPOid that was originally specified by an application or whether the system should use a different endpoint based on the categorization of the endpoints, and the different endpoint would necessarily have a different IPOPOid.

The process begins when IPOP attempts to match the IPOPOid in the request from the gateway with an endpoint stored in the IPOP database (step 1064). If IPOP has found an endpoint with a matching IPOPOid, then a determination is made as to whether the matched endpoint is a mission critical endpoint and whether a twin exists for the mission critical endpoint (step 1066). If so, then the IPOPOid of the twin endpoint is used to fetch the endpoint object from the IPOP database (step 1068), and an indication is set in the returned endpoint object that a twin endpoint was used to reroute the action (step 1070), and the process is complete. If the matched endpoint is not a mission critical endpoint or a twin does not exist for the mission critical endpoint, then the endpoint corresponding to the matched IPOPOid from the original request is then used (step 1072), and the process is complete. If neither condition holds but a matching IPOPOid is found, then the corresponding endpoint is fetched from the IPOP database (step 1074), and the process is complete.

With reference now to FIG. 10F, a figure depicts a graphical user interface window that may be used by a network or system administrator to set assign an endpoint to be used as a mission critical twin endpoint for a mission critical endpoint in accordance with a preferred embodiment of the present invention. Window 1090 is a dialog box or an equivalent user interface item within a network management application that allows an administrator to set a mission critical twin endpoint. In this example, the administrator has already chosen the mission critical endpoint for which an assignment will be made; text field 1091 contains the address of the mission critical endpoint. Check boxes 1092 allow the administrator to choose the manner in which the twin endpoint will be specified. Entry field 1093 may be used to enter the MAC address of the twin endpoint. Entry fields 1094 and 1095 may be used to enter a network address comprising a virtual private network number and an IP address, respectively. "Set" button 1096 assigns the twin endpoint, and "Clear" button 1097 clears the dialog box, or alternatively, clears the previous twin endpoint assignment for the mission critical endpoint.

With reference now to FIGS. 11A-11E, some simplified pseudo-code depicts the manner in which endpoint objects and action objects can be implemented in an object-oriented manner. FIG. 11A depicts a class for implementing action objects, while FIG. 11B depicts a manner in which an action object class can be extended to include mission critical categories. FIG. 11C depicts a class for implementing endpoints, while FIG. 11D and FIG. 11E depicts class for extending an endpoint class to include mission critical categories.

As noted previously, a service provider would rather not burden a mission critical machine with a monitoring operation that is directed to determining the mission critical machine's own status. The present invention takes advantage of the flexible polling and monitoring scheme associated with the DKS system by providing automatic associations between mission critical and non-mission critical endpoints. A backup status gathering machine may be automatically determined from the manner in which the machines have communicated rather that a static association assigned by an administrator, as explained below.

Figure 12A:
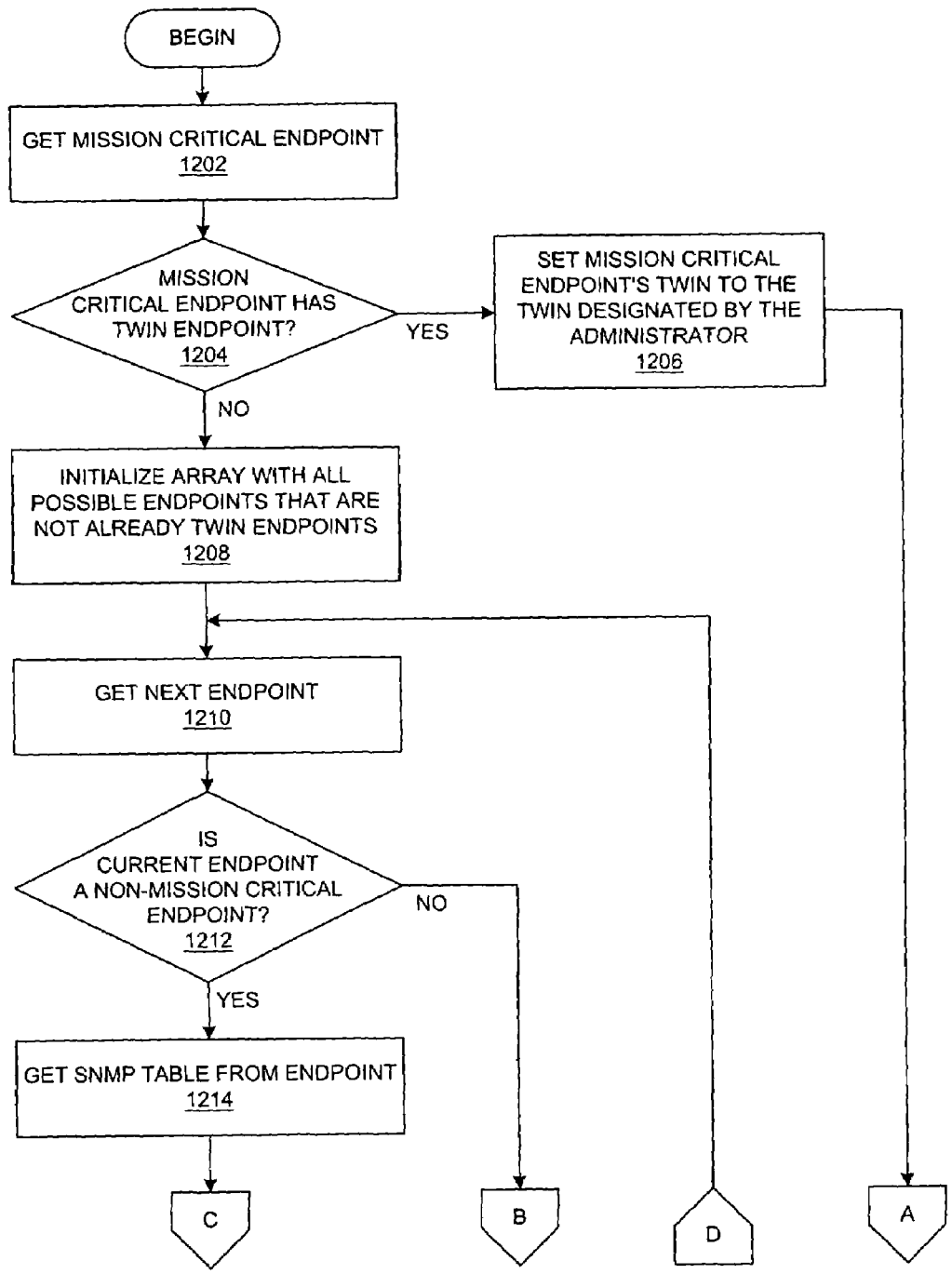
FIGS. 12A-12B depict a set of flowcharts that show a process by which a mission-critical-twin endpoint can be located for a mission critical endpoint in accordance with a preferred embodiment of the present invention.
Figure 12B:
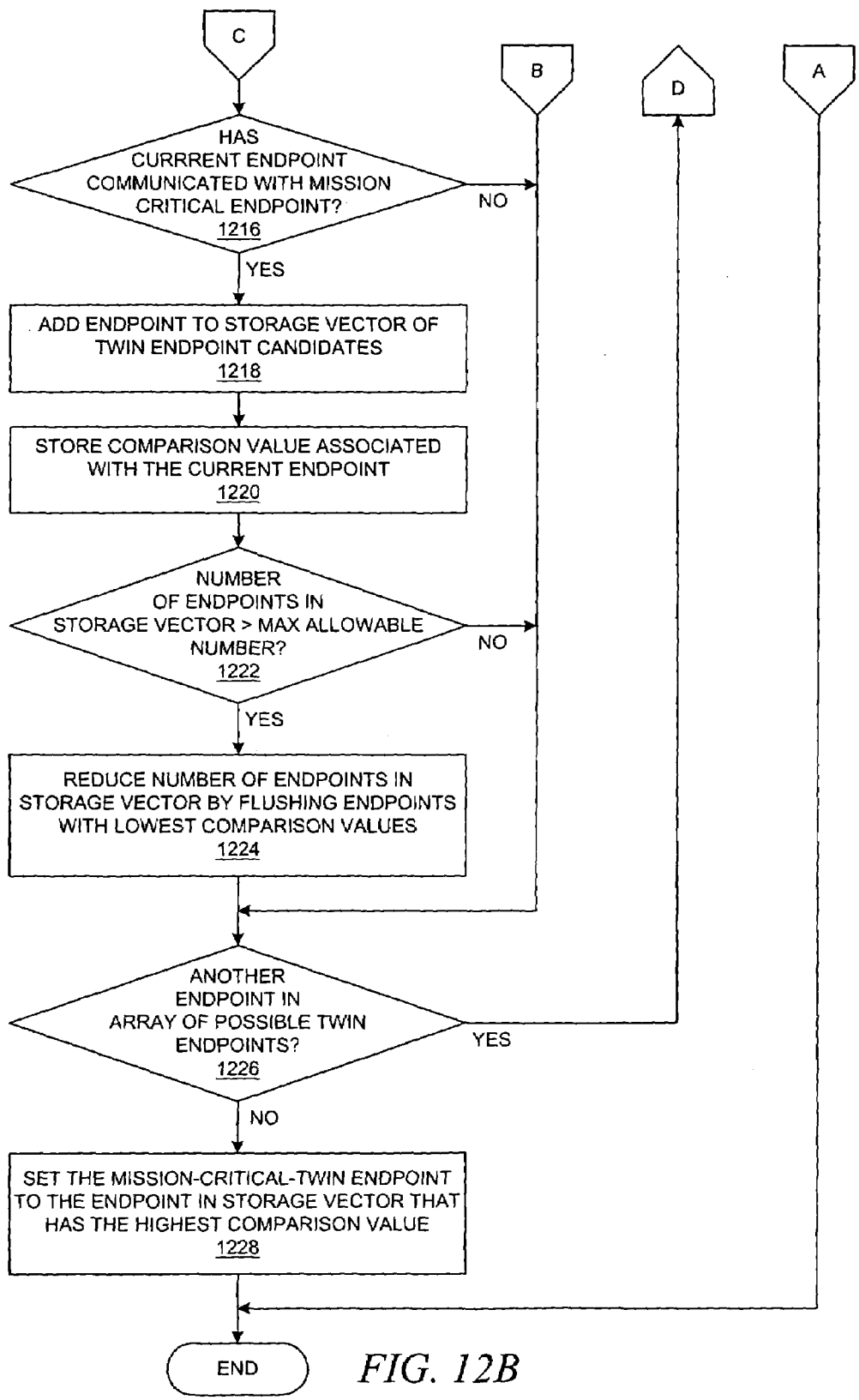

With reference now to FIGS. 12A-12B, a set of flowcharts depicts a process by which a mission-critical-twin endpoint can be located for a mission critical endpoint in accordance with a preferred embodiment of the present invention. The process begins by obtaining or receiving a mission critical endpoint (step 1202) and then determining whether or not a twin endpoint has been designated for the mission critical endpoint (step 1204). If a twin endpoint has been designated for the mission critical endpoint, then a mission-critical-twin endpoint is already identifiable. Hence, the twin for the mission critical endpoint is set equal to the twin that has been designated by the administrator (step 1206).

If a twin endpoint has not been designated for the mission critical endpoint, then an array is filled or initialized with all possible endpoints that are not already twin endpoints (step 1208). A next endpoint is then retrieved from the array (step 1210), and this endpoint is used as an endpoint that is currently being processed in the remaining steps. In other words, the following steps in FIGS. 12A-12B are an execution loop for processing the remaining endpoints within the array.

The process continues with a determination of whether or not the current endpoint is a non-mission critical endpoint (step 1212). If not, then the endpoint is a mission critical endpoint, which should not be used as a twin endpoint, and the process branches to step 1226 to process another endpoint from the array.

If the endpoint is a non-mission critical endpoint, then the SNMP table is retrieved from the endpoint (step 1214). A determination is made as to whether the current endpoint has communicated with the mission critical endpoint (step 1216), which can be done by searching the current endpoint's SNMP table for an address that corresponds to the address for the mission critical endpoint. Alternative mechanisms could be employed to determine a communication link between the current endpoint and the mission critical endpoint. If the current endpoint has not communicated with the mission critical endpoint, then it has not been affiliated or associated with the mission critical endpoint, and the current endpoint should not be used as a twin for the mission critical endpoint. Hence, the process branches to step 1226 to process another endpoint from the array.

If the current endpoint has communicated with the mission critical endpoint, then it is added to a storage vector of twin endpoint candidates (step 1218), i.e. some type of data structure for temporarily storing the endpoints other than the previously mentioned array. The number of times that the endpoint has communicated with the mission critical endpoint can also be stored in the storage vector as a subsequent comparison value, if available (step 1220). Otherwise, a default, configuration value that has been previously associated with the current endpoint may be stored with the current endpoint in the storage vector as a subsequent comparison value after retrieving the default value from the configuration service.

A check is then made as to whether the storage vector has reached a maximum allowable number of endpoints (step 1222). Since there may be many times the number of potential endpoints as there is space is the storage vector, the storage vector is flushed periodically during the process of finding a twin endpoint for the mission critical endpoint. If the number of endpoints in the storage vector has not reached the maximum number, then the process branches to step 1226. If it has, then the number of endpoints in the storage vector is reduced in some manner, such as by using the comparison value associated with each endpoint and only keeping the endpoints that are associated with the highest values, i.e. flushing the endpoints associated with the lowest values (step 1224).

A determination is then made as to whether there is another endpoint in the array to be processed (step 1226), and if so, then the process loops back to step 1210 to get the next unprocessed endpoint in the array. If all of the endpoints in the array have been processed, then the mission critical endpoint's twin is chosen. The mission-critical-twin is set to an endpoint remaining in the storage vector that has the largest number of attempts to add (step 1228), and the process is complete.

The advantages of the present invention should be apparent in view of the detailed description of the invention that is provided above. The present invention provides a flexible polling and monitoring scheme associated with network management tasks in a highly distributed system. Backup monitoring of endpoints can be accomplished through the use of system level information. A non-mission-critical endpoint is associated with a mission-critical endpoint based on the non-mission-critical endpoint's communication history with the mission critical endpoint. The management system may use the status of a non-mission-critical endpoint as a reflection of the status of a mission-critical endpoint.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for managing a distributed data processing system, the method comprising:
  configuring monitoring parameters for network interface cards within the distributed data processing system using a network management framework;
  dynamically discovering a set of discovered endpoints within the distributed data processing system;
  designating a plurality of discovered endpoints as mission critical endpoints;
  choosing mission critical twin endpoints from a subset of discovered endpoints which have not been previously specified as twin endpoints; and
  associating a mission critical twin endpoint with each mission critical endpoint, wherein a mission critical twin endpoint is a discovered endpoint that has a communication history with a mission critical endpoint with which the mission critical twin endpoint is being associated.

2. The method of claim 1 further comprising:
  retrieving a Simple Network Management Protocol (SNMP) table from a discovered endpoint;
  searching the SNMP table for an address associated with a mission critical endpoint; and
  associating the discovered endpoint with the mission critical endpoint in response to finding the address associated with the mission critical endpoint in the SNMP table.

3. The method of claim 1 further comprising:
  selecting an endpoint in the subset of discovered endpoints that has a most significant communication history with a particular mission critical endpoint; and
  creating a mission critical twin association between the selected endpoint and the particular mission critical endpoint in response to a determination of the most significant communication history.

4. The method of claim 3 further comprising:
  retrieving a Simple Network Management Protocol (SNMP) table from a discovered endpoint in the subset of discovered endpoints;
  searching the SNMP table for an address associated with the particular mission critical endpoint;
  in response to finding the address associated with the particular mission critical endpoint in the SNMP table, obtaining a value from the SNMP table to be compared with values obtained from other retrieved SNMP tables; and
  determining the most significant communication history based on a comparison of the values obtained from the retrieved SNMP tables.

5. A apparatus for managing a distributed data processing system, the apparatus comprising:
  configuring means for configuring monitoring parameters for network interface cards within the distributed data processing system using a network management framework;
  discovering means for dynamically discovering a set of discovered endpoints within the distributed data processing system;
  designating means for designating a plurality of discovered endpoints as mission critical endpoints;
  first associating means for associating a mission critical twin endpoint with each mission critical endpoint, wherein a mission critical twin endpoint is a discovered endpoint that has a communication history with a mission critical endpoint with which the mission critical twin endpoint is being associated; and
  rerouting means for rerouting an action directed to a given mission critical endpoint to the given mission critical endpoint's associated mission critical twin endpoint.

6. The apparatus of claim 5 further comprising:
  wherein the action is a polling action, and the associated mission critical twin endpoint responds to the polling action directed to the given mission critical endpoint in lieu of the given mission critical endpoint responding to the polling action to thereby automatically limit bandwidth consumption of the given mission critical endpoint.

7. The apparatus of claim 5
  wherein the action is an action object from an application reguesting the action on the given mission critical endpoint.

8. The apparatus of claim 7
  wherein the application reguests the action on the given mission critical endpoint without regard to whether the mission critical endpoint has been specially categorized as being mission critical, and a response for a given mission critical twin endpoint associated with the given mission critical endpoint is provided to the application in lieu of a response for the given mission critical endpoint to thereby automatically limit bandwidth consumption of the given mission critical endpoint.

9. A computer program product in a computer readable medium for use in a distributed data processing system for managing the distributed data processing system, the computer program product comprising:
  instructions for configuring monitoring parameters for network interface cards within the distributed data processing system using a network management framework;
  instructions for dynamically discovering a set of discovered endpoints within the distributed data processing system;
  instructions for designating a plurality of discovered endpoints as mission critical endpoints;
  instructions for choosing mission critical twin endpoints from a subset of discovered endpoints which have not been previously specified as twin endpoints; and
  instructions for associating a mission critical twin endpoint with each mission critical endpoint, wherein a mission critical twin endpoint is a discovered endpoint that has a communication history with a mission critical endpoint with which the mission critical twin endpoint is being associated.

10. The computer program product of claim 9 further comprising:
  instructions for retrieving a Simple Network Management Protocol (SNMP) table from a discovered endpoint;
  instructions for searching the SNMP table for an address associated with a mission critical endpoint; and
  instructions for associating the discovered endpoint with the mission critical endpoint in response to finding the address associated with the mission critical endpoint in the SNMP table.

11. The computer program product of claim 9 further comprising:
  instructions for selecting an endpoint in the subset of discovered endpoints that has a most significant communication history with a particular mission critical endpoint; and instructions for creating a mission critical twin association between the selected endpoint and the particular mission critical endpoint in response to a determination of the most significant communication history.

12. The computer program product of claim 11 further comprising:

instructions for retrieving a Simple Network Management Protocol (SNMP) table from a discovered endpoint in the subset of discovered endpoints;

instructions for searching the SNMP table for an address associated with the particular mission critical endpoint;

instructions for obtaining, in response to finding the address associated with the particular mission critical endpoint in the SNMP table, a value from the SNMP table to be compared with values obtained from other retrieved SNMP tables; and instructions for determining the most significant communication history based on a comparison of the values obtained from the retrieved SNMP tables.

* * * * *